US00RE43190E

(19) United States
(12) Reissued Patent
Tasaki et al.

(10) Patent Number: US RE43,190 E
(45) Date of Reissued Patent: Feb. 14, 2012

(54) SPEECH CODING APPARATUS AND SPEECH DECODING APPARATUS

(75) Inventors: Hirohisa Tasaki, Tokyo (JP); Tadashi Yamaura, Tokyo (JP)

(73) Assignee: Mitsubishi Denki Kabushiki Kaisha, Tokyo (JP)

(21) Appl. No.: 12/695,942

(22) Filed: Jan. 28, 2010

Related U.S. Patent Documents

Reissue of:
(64) Patent No.: 7,047,184
Issued: May 16, 2006
Appl. No.: 09/706,813
Filed: Nov. 7, 2000

U.S. Applications:
(62) Division of application No. 12/153,188, filed on May 14, 2008.

(30) Foreign Application Priority Data

Nov. 8, 1999 (JP) ..... 11-317205

(51) Int. Cl.
*G10L 19/00* (2006.01)

(52) U.S. Cl. ..... 704/200.1; 704/200; 704/207; 704/219

(58) Field of Classification Search ..... 704/200.1, 704/200, 207, 219
See application file for complete search history.

(56) References Cited

U.S. PATENT DOCUMENTS 5,732,389 A 3/1998 Kroon et al.
5,745,871 A 4/1998 Chen
5,781,880 A 7/1998 Su
5,787,389 A 7/1998 Taumi et al.
6,202,046 B1 3/2001 Oshikiri et al.
6,226,604 B1 5/2001 Ehara et al.
6,408,268 B1 6/2002 Tasaki
6,453,288 B1 9/2002 Yasunaga et al.
6,496,796 B1 12/2002 Tasaki et al.

(Continued)

FOREIGN PATENT DOCUMENTS

EP 0 694 907 A 1/1996

(Continued)

OTHER PUBLICATIONS

Kataoka, Akitoshi et al., "Basic Algorithm of Conjugate-Structure Algebraic CELP (CS-ACELP) Speech Coder", NTT R&D vol. 45, No. 4, 1996.

(Continued)

*Primary Examiner* — Qi Han
(74) *Attorney, Agent, or Firm* — Birch, Stewart, Kolasch & Birch, LLP

(57) ABSTRACT

A speech coding apparatus comprises a repetition period pre-selecting unit for generating a plurality of candidates for the repetition period of a driving excitation source by multiplying the repetition period of an adaptive excitation source by a plurality of constant numbers, respectively, and for pre-selecting a predetermined number of candidates from all the candidates generated. A driving excitation source coding unit provides both excitation source location information and excitation source polarity information that minimize a coding distortion, for each of the predetermined number of candidates, and provides an evaluation value associated with the minimum coding distortion for each of the predetermined number of candidates. A repetition period coding unit compares the evaluation values provided for the predetermined number of candidates with one another, selects one candidate from the predetermined number of candidates according to the comparison result, and furnishes selection information indicating the selection result, excitation source location code, and polarity code.

4 Claims, 16 Drawing Sheets

U.S. PATENT DOCUMENTS 6,507,814 B1 1/2003 Gao

FOREIGN PATENT DOCUMENTS

| | | | |
|---|---|---|---|
| EP | 0 694 907 | A2 | 1/1996 |
| EP | 0 743 634 | A1 | 11/1996 |
| EP | 0 883 107 | A1 | 12/1998 |
| JP | 61-134000 | A | 6/1986 |
| JP | 63-96699 | A | 4/1988 |
| JP | 1-200296 | A | 8/1989 |
| JP | 02-08900 | A | 1/1990 |
| JP | 5-19794 | A | 1/1993 |
| JP | 5-19795 | A | 1/1993 |
| JP | 10-069297 | | 3/1998 |
| JP | 10-232696 | | 9/1998 |
| JP | 10-232696 | A | 9/1998 |
| JP | 10-293599 | A | 11/1998 |
| JP | 10-312198 | | 11/1998 |
| JP | 10-312198 | A | 11/1998 |
| WO | WO-98/40877 | | 9/1998 |

OTHER PUBLICATIONS

Tsuchiya, Katsumi et al., "Improved CELP speech coding using adaptive pulse position algebraic codebook" , Nihon Onkyo Gakkai (The Acoustical Society of Japan) Kouen Ronbunshuu, pp. 213-214, Mar. 1999.

Moriya, Takehiro, "Medium-Delay 8 K/Bit/S Speech Coder Based on Conditional Pitch Prediction," Proceedings of the International Conference on Spoken Language Processing (ICSLP), Nov. 18-22, vol. 1, No. 18, pp. 653-656, Tokyo, Japan, 1990.

Jung, Chan-Joong et al., "On a Low Bit Rate Speech Coder Using Multi-Level Amplitude Algebraic Method," IEEE, pp. 1444-1448, 1999.

Salami, R. et al., "8 KBITS/ACELP Coding of Speech with 10 MS Speech-Frame," IEEE, pp. II-97-II100, 1994.

Johnson et al., "Pitch-Orthogonal Code-Excited LPC", IEEE, Globecom '90, vol. 1, pp. 542-546, Dec. 2, 1990, XP000218787.

FIG.12

EXCITATION SOURCE LOCATION TABLE

| EXCITATION SOURCE NUMBER | EXCITATION SOURCE LOCATION CANDIDATE | MAGNITUDE |
|---|---|---|
| 1 | 0, 5, 10, 15, 20, 25, 30, 35 | 1.0 |
| 2 | 1, 6, 11, 16, 21, 26, 31, 36 | 1.0 |
| 3 | 2, 7, 12, 17, 22, 27, 32, 37 | 1.0 |
| 4 | 3, 8, 13, 18, 23, 28, 33, 38<br>4, 9, 14, 19, 24, 29, 34, 39 | 1.2 |

FIG.16 (PRIOR ART)

EXCITATION SOURCE LOCATION TABLE

| EXCITATION SOURCE NUMBER | EXCITATION SOURCE LOCATION CANDIDATE |
|---|---|
| 1 | 0, 5, 10, 15, 20, 25, 30, 35 |
| 2 | 1, 6, 11, 16, 21, 26, 31, 36 |
| 3 | 2, 7, 12, 17, 22, 27, 32, 37 |
| 4 | 3, 8, 13, 18, 23, 28, 33, 38<br>4, 9, 14, 19, 24, 29, 34, 39 |

SPEECH CODING APPARATUS AND SPEECH DECODING APPARATUS

Matter enclosed in heavy brackets [ ] appears in the original patent but forms no part of this reissue specification; matter printed in italics indicates the additions made by reissue.

*The present application is a divisional application of application Ser. No. 12/153,188, which was filed May 14, 2008 as a reissue application of application Ser. No. 09/706,813 filed Nov. 7, 2000, now U.S. Pat. No. 7,047,184, which claims priority under 35 U.S.C. § 119 to Japanese application No. 11-317205 filed on Nov. 8, 1999, the entire contents of which are incorporated herein by reference. The present application is related to co-pending application Ser. Nos. 12/695,917 and 12/695,954, which are also divisional applications of the aforementioned reissue application Ser. No. 12/153,188.*

BACKGROUND OF THE INVENTION

1. Field of the Invention

The present invention relates to a speech coding apparatus for compressing a digital speech signal to an equivalent signal having a smaller amount of information, and a speech decoding apparatus for decoding speech code generated by the speech coding apparatus or the like to reconstruct a digital speech signal.

2. Description of the Prior Art

Prior art speech coding apparatuses separate an input speech into spectral envelope information and an excitation source and encode them on a frame-by-frame basis, where each frame has a certain length, so as to generate speech code, and prior art speech decoding apparatuses decode the speech code and generate decoded speech by combining the spectral envelope information and the excitation source using a synthesis filter. Typical prior art speech coding apparatuses and speech decoding apparatuses employ a code-excited linear prediction (CELP) coding technique.

Referring now to FIG. 14, there is illustrated a block diagram showing the structure of a prior art CELP speech coding apparatus. FIG. 15 is a block diagram showing the structure of a prior art CELP speech decoding apparatus. In FIG. 14, reference numeral 1 denotes an input speech, numeral 2 denotes a linear prediction analyzer, numeral 3 denotes a linear prediction coefficient coding unit, numeral 4 denotes an adaptive excitation source coding unit, numeral 5 denotes a driving excitation source coding unit, numeral 6 denotes a gain coding unit, numeral 7 denotes a multiplexer, and numeral 8 denotes speech code. In FIG. 15, reference numeral 9 denotes a separator, numeral 10 denotes a linear prediction coefficient decoding unit, numeral 11 denotes an adaptive excitation source decoding unit, numeral 12 denotes a driving excitation source decoding unit, numeral 13 denotes a gain decoding unit, numeral 14 denotes a synthesis filter, and numeral 15 denotes output speech.

In operation, the prior art speech coding apparatus performs its coding operation on a frame-by-frame basis, where each frame has a duration ranging from 5 to 50 msec. Similarly, the prior art speech decoding apparatus performs its decoding operation on a frame-by-frame basis. In the speech coding apparatus of FIG. 14, the input speech 1 is applied to the linear prediction analyzer 2, the adaptive excitation source coding unit 4, and the gain coding unit 6. The linear prediction analyzer 2 analyzes the input speech 1 so as to extract a linear prediction coefficient that is the spectral envelope information of the input speech 1. The linear prediction coefficient coding unit 3 then encodes the linear prediction coefficient and furnishes the coded result to the multiplexer 7. The linear prediction coefficient coding unit 3 also quantizes the linear prediction and furnishes the quantized linear prediction to the adaptive excitation source coding unit 4, the driving excitation source coding unit 5, and the gain coding unit 6 for coding an excitation source separated from the input speech 1.

The adaptive excitation source coding unit 4 stores a past excitation source (or signal) of a certain length as an adaptive excitation source code book (i.e., adaptive code book) and generates a plurality of adaptive excitation source codes each of which is a multiple-bit binary value. For each of the plurality of adaptive excitation source codes, the adaptive excitation source coding unit 4 also generates a time-series vector that is a series of pitch-cycles each of which includes the past excitation source. The adaptive excitation source coding unit 4 then multiplies the plurality of time-series vectors by an appropriate gain and allows the multiplication result to pass through a synthesis filer (not shown) using the quantized linear prediction coefficient from the linear prediction coefficient coding unit 3 so as to generate a temporary synthesized speech. The adaptive excitation source coding unit 4 calculates and examines the distance between the temporary synthesized speech and the input speech 1 and selects one adaptive excitation source code which minimizes the distance from the plurality of adaptive excitation source codes. The adaptive excitation source coding unit 4 then delivers the selected adaptive excitation source code to the multiplexer 7. The adaptive excitation source coding unit 4 also furnishes the time-series vector associated with the selected adaptive excitation source code as an adaptive excitation source to the driving excitation source coding unit 5 and the gain coding unit 6. The adaptive excitation source coding unit 4 further delivers either the input speech 1 or a signal obtained by substituting synthesized speech generated from the adaptive excitation source from the input signal 1, as a signal to be coded, to the driving excitation source coding unit 5.

The driving excitation source coding unit 5 contains a driving excitation source code book and generates a plurality of driving excitation source codes each of which is a multiple-bit binary value. For each of the plurality of driving excitation source codes, the driving excitation source coding unit 5 also reads a time-series vector from the driving excitation source code book. The driving excitation source coding unit 5 then multiplies both the plurality of time-series vectors and the adaptive excitation source output from the adaptive excitation source coding unit 4 by respective appropriate gains and calculates the sum of them and allows the sum to pass through a synthesis filter (not shown) using the quantized linear prediction coefficient from the linear prediction coefficient coding unit 3 so as to generate a temporary synthesized speech. The driving excitation source coding unit 5 calculates and examines the distance between the temporary synthesized speech and the signal to be coded, which is either the input speech 1 or the signal obtained by substituting the synthesized speech generated from the adaptive excitation source from the input signal 1, and selects one driving excitation source code which minimizes the distance from the plurality of driving excitation source codes. The driving excitation source coding unit 5 then delivers the selected driving excitation source code, to the multiplexer 7. The driving excitation source coding unit 5 also furnishes the time-series vector associated with the selected driving excitation source code as a driving excitation source to the gain coding unit 6.

The gain coding unit 6 stores a gain code book therein and generates a plurality of gain codes, each of which is a multiple-bit binary value. For each of the plurality of gain codes, the gain coding unit 6 also reads a gain vector sequentially from the gain code book. The gain coding unit 6 then multiplies both the adaptive excitation source output from the adaptive excitation source coding unit 4 and the driving excitation source output from the driving excitation source coding unit 5 by two elements of the gain vector, respectively, and calculates the sum of them so as to generate an excitation source and allows the excitation source to pass through a synthesis filter (not shown) using the quantized linear prediction coefficient from the linear prediction coefficient coding unit 3 so as to generate a temporary synthesized speech. The gain coding unit 6 calculates and examines the distance between the temporary synthesized speech and the input speech 1, and selects one gain code which minimizes the distance from the plurality of gain codes. The gain coding unit 6 then delivers the selected gain code to the multiplexer 7. The gain coding unit 6 also furnishes the generated excitation source corresponding to the selected gain code to the adaptive excitation source coding unit 4.

Finally, the adaptive excitation source coding unit 4 updates the adaptive code book located therein using the excitation source corresponding to the gain code selected by the gain coding unit 6.

The multiplexer 7 multiplexes the linear prediction coefficient code from the linear prediction coefficient coding unit 3, the adaptive excitation source code from the adaptive excitation source coding unit 4, the driving excitation source code from the driving excitation source coding unit 5, and the gain code from the gain coding unit 6 into a speech code 8, and outputs the speech code 8.

In the speech decoding apparatus of FIG. 15, the separator 9 separates the speech code 8 from the speech coding apparatus into the linear prediction coefficient code, the adaptive excitation source code, the driving excitation source code, and the gain code. The separator 9 then furnishes them to the linear prediction coefficient decoding unit 10, the adaptive excitation source decoding unit 11, the driving excitation source decoding unit 12, and the gain decoding unit 13, respectively. The linear prediction coefficient decoding unit 10 decodes the linear prediction coefficient code from the separator 9 so as to reconstruct the linear prediction coefficient. The linear prediction coefficient decoding unit 10 then sets and outputs the linear prediction coefficient as a filter coefficient for the synthesis filter 14.

The adaptive excitation source decoding unit 11 stores a past excitation source as an adaptive excitation source code book. The adaptive excitation source decoding unit 11 also generates a time-series vector that is a series of pitch-cycles each of which includes the past excitation source, as an adaptive excitation source, the time-series vector being associated with the adaptive excitation source code separated by the separator 9. The driving excitation source decoding unit 12 generates a time-series vector as a driving excitation source, the time-series vector being associated with the driving excitation source code separated by the separator 9. The gain decoding unit 13 also generates a gain vector associated with the gain code separated by the separator 9. The speech decoding apparatus then multiplies both the first and second time-series vectors from the adaptive excitation source decoding unit and the driving excitation source decoding unit by two elements of the gain vector from the gain decoding unit, respectively, so as to generate an excitation source and allows the excitation source to pass through the synthesis filter 14 so as to generate output speech 15. Finally, the adaptive excitation source decoding unit 11 updates the adaptive excitation source code book located therein using the generated excitation source.

Next, a description will be made as to an improvement in the prior art CELP speech coding and decoding apparatuses mentioned above. "Basic algorithm of conjugate-structure algebraic CELP (CS-ACELP) speech coder" by A. Kataoka et al., NTT R&D, Vol. 45, April 1996, which will be referred to as Reference 1, discloses a CELP speech coding apparatus and a CELP speed decoding apparatus including a excitation source pulse for coding a driving excitation source with the aim of reducing the amount of calculations and the amount of memory. In this prior art arrangement, the driving excitation source is represented only by information about the locations of a number of pulses and information about the polarities of the plurality of pulses. Such an excitation source is called an algebraic excitation source, and provides a good coding performance considering that it has a simple structure. Recently-developed standard coding techniques adopt the algebraic excitation source.

Referring next to FIG. 16, there is illustrated a table listing candidates for the locations of the excitation source pulses employed by the CELP speech coding and decoding apparatuses disclosed in Reference 1. Such the table can be located in both the driving excitation source coding unit 5 of the speech coding apparatus as shown in FIG. 14 and the driving excitation source decoding unit 12 of the speech decoding apparatus as shown in FIG. 15. In Reference 1, the length of frames to be coded when coding excitation sources is 40 samples, and the driving excitation source consists of four pulses. Three of them numbered 1 to 3 have 8 limited possible locations as shown in FIG. 16, respectively. Therefore, each of the locations of the three pulses can be coded in three bits. The remaining pulse numbered 4 has 16 limited possible locations as shown in FIG. 16. Therefore, the location of the fourth pulse can be coded in four bits. The number of candidates for the location of each of the four excitation source pulses is limited in this way, and the amount of bits used for coding the driving excitation source and the number of combinations of the locations of those excitation source pulses are therefore reduced. This results in a reduction in the amount of arithmetic operations without reducing the coding performance.

In accordance with the coding technique as disclosed in Reference, the driving excitation source coding unit 5 of the speech coding apparatus of FIG. 14 calculates a correlation between an impulse response (i.e., a synthesized speech generated by a single excitation source pulse) and a signal to be coded, and a cross-correlation between impulse responses (i.e., synthesized speeches respectively generated by single excitation source pulses), and stores them as a pre-table therein and calculates the distance (or coding distortion) by simply calculating the sum of them. The driving excitation source coding unit 5 then searches for the pulse locations and polarities that minimize the distance.

The concrete searching method as disclosed in Reference 1 will be described hereinafter. The minimization of the distance is equivalent to the maximization of an evaluation value D given by the following equation:

$$D=C^2/E \tag{1}$$

where C and E are given by:

$$C = \sum_k g(k)d(m_k) \quad (2)$$

$$E = \sum_k \sum_i g(k)g(i)\phi(m_k, m_i) \quad (3)$$

where $m_k$ is the location of the kth pulse, g(k) is the magnitude of the kth pulse, d(x) is the correlation between an impulse response generated when an impulse is placed at the pulse position x and the signal to be coded, and $\phi(x,y)$ is the cross-correlation between an impulse response generated when an impulse is placed at the pulse location x and an impulse response generated when an impulse is placed at the pulse location y. The searching process is carried out by the calculation of the evaluation value D for all combinations of the possible locations of all excitation source pulses.

In addition, simplifying the above equations (2) and (3) by assuming that g(k) has the same sign as $d(m_k)$ and has an absolute value of 1 yields the following equations (4) and (5):

$$C = \sum_k d'(m_k) \quad (4)$$

$$E = \sum_k \sum_i \phi'(m_k, m_i) \quad (5)$$

where $$d'(m_k)=|d(m_k)| \quad (6)$$

$$\phi'(m_k, m_i)=\mathrm{sign}[d(m_k)]\mathrm{sign}[d(m_i)]\phi(m_k, m_i) \quad (7)$$

Only calculating $d'(m_k)$ and $\phi'(m_k, m_i)$ in advance of the calculation of the evaluation value D for all combinations of the locations of all excitation source pulses is thus needed before the simple summations according to the equations (4) and (5), thereby reducing the amount of arithmetic operations.

Japanese patent application publications (TOKKAIHEI) No. 10-232696 and No. 10-312198, and "Improvements in ACELP speech coding based on adaptive pulse locations", by Tsuchiya et al., Nihon Onkyo Gakkai (The Acoustical Society of Japan) 1999 Shunki Kenkyuu Happyokai Kouen Ronbunshuu vol.I, pp. 213-214, 1999, which will be referred to as Reference 2, disclose configurations for improving the quality of the algebraic excitation source mentioned above.

Japanese patent application publication No. 10-232696 discloses a method of providing a plurality of fixed waveforms and generating a driving excitation source by placing the plurality of fixed waveforms at a plurality of locations coded algebraically, respectively, thereby yielding an output speech with a high quality. Reference 2 studies an arrangement in which a pitch filter is contained in a generating unit for generating a driving excitation source (in reference 2, an ACELP excitation source). Either of the arrangement of the plurality of fixed waveforms and the pitch-filtering process to generate a pitch-filtered driving excitation source can improve the quality of the output speech without increasing the amount of searching operations if it is carried out at the same time that the calculation of impulse responses is done.

Japanese patent application publication No. 10-312198 discloses an arrangement in which the locations of excitation sources pulses are searched for while the driving excitation source is made to be orthogonal to the adaptive excitation source when the pitch gain is greater than or equal to a predetermined value.

Referring next to FIG. 17, there is illustrated a block diagram showing in details the structure of a driving excitation source coding unit 5 of an improved CELP speech coding apparatus disclosed in Japanese patent application publication No. 10-232696 and Reference 2. In the figure, reference numeral 16 denotes a perceptual weighting filter coefficient calculating unit, numerals 17 and 19 denote perceptual weighting filters, numeral 18 denotes a basic response generating unit, numeral 20 denotes a pre-table calculating unit, numeral 21 denotes a searching unit, and numeral 22 denotes an excitation source location table.

Next, the operation of the driving excitation source coding unit 5 will be described. A quantized linear prediction coefficient from a linear prediction coefficient coding unit 3 disposed within the speech coding apparatus as shown in FIG. 14 is applied to the perceptual weighting filter coefficient calculating unit 16 and the basic response generating unit 18. An adaptive excitation source coding unit 4 furnishes a signal to be coded that is either an input speech 1 or a signal obtained by substituting synthesized speech generated from an adaptive excitation source from the input speech 1 to the perceptual weighting filter 17. The adaptive excitation source coding unit 4 also delivers the repetition period of the adaptive excitation source converted from an adaptive excitation source code to the basic response generating unit 18.

The perceptual weighting filter coefficient calculating unit 16 then calculates a perceptual weighting filter coefficient using the quantized linear prediction coefficient and sets the calculated perceptual weighting filter coefficient as a filter coefficient intended for the perceptual weighting filters 17 and 19. The perceptual weighting filter 17 performs a filtering process on the input signal to be coded using the filter coefficient set by the perceptual weighting filter coefficient calculating unit 16.

The basic response generating unit 18 performs pitch filtering on a unit impulse or a fixed waveform using the repetition period of the adaptive excitation source so as to generate a series of cycles each of which includes the unit impulse or the fixed waveform, the repetition period of the series of cycles being equal to that of the adaptive excitation source. The basic response generating unit 18 then allows the generated signal, as an excitation source, to pass through a synthesis filter formed using the quantized linear prediction coefficient to generate synthesized speech, and outputs the synthesized speech as a basic response. The perceptual weighting filter 19 performs a filtering process on the basis response using the filter coefficient set by the perceptual weighting filter coefficient calculating unit 16.

The pre-table calculating unit 20 calculates the correlation d(x) between the perceptual weighted signal to be coded and the perceptual weighted basic response when placing the impulse at the location x, and calculates the cross-correlation $\phi(x,y)$ between the perceptual weighted basic response when placing the impulse at the location x and the perceptual weighted basic response when placing the impulse at the location y. The pre-table calculating unit 20 then obtains $d'(x)$ and $\phi'(x,y)$ according to equations (6) and (7) and stores them as a pre-table.

The excitation source location table 22 stores a plurality of candidates for the locations of excitation source pulses, which are similar to those as shown in FIG. 16. The searching unit 21 sequentially reads each of all combinations of the possible locations of the excitation source pulses from the excitation source location table 22 and calculates an evaluation value D for each combination of the possible locations of the excitation source pulses using the pre-table calculated by the pre-table calculating unit 20 according to above-mentioned equations (1), (4) and (5). The searching unit 21 also searches for one combination of the possible locations of the excitation source pulses which maximizes the evaluation value D and furnishes excitation source location code (i.e., indexes of the excitation source location table) indicating the combination of the possible locations of the excitation source pulses and polarity code indicating the polarities of them, as driving excitation source code, to a multiplexer 7 as shown in FIG. 14. The searching unit 21 further delivers one time-series vector associated with the driving excitation source code to a gain coding unit 6 as shown in FIG. 14.

In Japanese patent application publication No. 10-312198, the method of making the driving excitation source orthogonal to the adaptive excitation source is implemented by making the perceptual weighted signal to be coded which is input to the pre-table calculating unit 20 orthogonal to the adaptive excitation source, and contributions associated with the correlation between the adaptive excitation source and each driving excitation source pulse are subtracted from E given by equation (5) in the searching unit 21.

A problem encountered with prior art speech coding apparatuses and prior art speech decoding apparatuses constructed as above is that while the pitch-filtering process to generate a pitch-filtered driving excitation source can improve the coding performance without increasing the amount of searching operations, the use of the repetition period of an adaptive excitation source as the repetition period intended for the pitch-filtering process can degrade the quality of speech code generated when the pitch-period of an input speech is different from the repetition period of the adaptive excitation source.

FIG. 18 shows a relationship between a signal to be coded and the locations of pulses included in each pitch-cycle of a pitch-filtered driving excitation source, when the repetition period of the adaptive excitation source is two times the pitch-period of an input speech, in accordance with a prior art speech coding apparatus and a prior art speech decoding apparatus. FIG. 19 shows a relationship between a signal to be coded and the locations of pulses included in each pitch-cycle of a pitch-filtered driving excitation source, when the repetition period of the adaptive excitation source is one-half the pitch-period of an input speech, in accordance with a prior art speech coding apparatus and a prior art speech decoding apparatus.

The repetition period of the adaptive excitation source is determined such that the coding distortion between a synthesized speech generated based on the adaptive excitation source and the signal to be coded is minimized. Therefore the repetition period of the adaptive excitation source is frequently different from the pitch-period of the input speech that is the period of vibrations of the speaker's vocal cords. In this case, the repetition period of the adaptive excitation source is approximately an integral multiple or submultiple of the pitch-period of the input speech. In many cases, the repetition period of the adaptive excitation source is about two times or one-half the pitch-period.

In FIG. 18, since the speaker's vocal cords vibrate in the same way every other pitch-cycle, it is determined that the repetition period of the adaptive excitation source is about two times as large as the pitch-period of the input speech. When the driving excitation source is coded using the repetition period of the adaptive excitation source, most excitation source pulses are concentrated in the first half of the period of each pitch-cycle. The pitch-filtered driving excitation source that is the series of pitch-cycles thus obtained in the current frame using the repetition period of the adaptive excitation source is as shown in FIG. 18. The use of the excitation source pitch-filtered using the repetition period different from the pitch-period of the input speech can cause a change in the tone quality of the frame and hence unstability in the synthesized speech. This disadvantage does not become negligible as the bit rate decreases and the amount of information about the driving excitation source therefore decreases. Frames in which the magnitude of the adaptive excitation source is less than that of the driving excitation source have noticeable degradation of the sound quality.

In FIG. 19, since there is a predominance of low-frequency components in the input speech signal and the waveform of the first half of each pitch-cycle of the input speech is similar to that of the second half of each pitch-cycle, it is determined that the repetition period of the adaptive excitation source is about one-half the pitch-period of the input speech. As in the case of FIG. 18, the use of the excitation source pitch-filtered using the repetition period different from the pitch-period of the input speech can cause a change in the tone quality of the frame and hence unstability in the synthesized speech.

When the bit rate decreases and the amount of information about the driving excitation source therefore decreases, there is a tendency that the driving excitation source determined such that the waveform distortion (or coding distortion) is minimized has a large error in a band of low magnitudes and the synthesized speech therefore has a large spectral distortion. Such a spectral distortion can be detected as degradation of the sound quality. Although a perceptual weighting process is provided in order to eliminate degradation of the sound quality due to spectral distortions, an enhancement of the perceptual weighting process can cause an increase in the waveform distortion and hence degradation of the sound quality showing a ragged sound. The enhancement of the perceptual weighting process is therefore controlled such that the adverse effect on the sound quality by the waveform distortion has the same level as that by the spectral distortion. However, the spectral distortion is increased when the input speech is a female one, and the perceptual weighting process cannot be controlled so that it is optimized for both male and female speeches.

In prior art configurations, a constant magnitude is provided for a plurality of excitation sources, such as pulses, placed at respective locations within each pitch-cycle included in each frame. There is no use in equalizing the magnitudes of the plurality of excitation sources regardless of the difference in the number of candidates for the location of each of the plurality of excitation sources. In the excitation source location table as shown in FIG. 16, three bits are used for each of the excitation source locations numbered 1 to 3 and four bits are used for the remaining excitation source location numbered 4. It is easily expected by examining a maximum of a correlation between each of the plurality of excitation sources placed at a possible location and the signal to be coded that the excitation source number 4 having the largest number of possible locations has a higher probability of providing the largest correlation. Assume an extreme case where no bit is provided for an excitation source number. In the case where no bit is provided for an excitation source number, i.e., one excitation source is fixed at a certain location, the correlation between the excitation source and the signal to be coded is small while the polarity is provided independently. This means that it is not appropriate to provide a larger magnitude for one excitation source as compared with those provided for other excitation sources. The problem with prior art configurations is thus that the magnitudes of the plurality of excitation sources are not optimized.

Although a prior art configuration is disclosed for providing an individual magnitude for each of the plurality of excitation sources through vector quantization during the gain quantization process, the amount of gain-quantized information increases and the gain quantization process increases in complexity.

The above-mentioned technique of making the driving excitation source orthogonal to the adaptive excitation source causes an increase in the amount of searching operations. Therefore, an increase in the number of combinations of algebraic excitation sources puts an enormous load on the coding or decoding process. Especially, when using the technique of making the driving excitation source orthogonal to the adaptive excitation source in a prior art configuration that generates a driving excitation source by placing a plurality of fixed waveforms or performs a pitch-filtering process to generate a pitch-filtered driving excitation source, the amount of arithmetic operations increase greatly.

SUMMARY OF THE INVENTION

The present invention is proposed to solve the above problems. It is therefore an object of the present invention to provide a speech coding apparatus capable of generating high-quality speech code and a speech decoding apparatus capable of reconstructing a high-quality speech.

It is another object of the present invention to provide a speech coding apparatus capable of generating high-quality speech code while keeping an increase in the amount of arithmetic operations to a minimum and a speech decoding apparatus capable of reconstructing a high-quality speech while keeping an increase in the amount of arithmetic operations to a minimum.

[In accordance with one aspect of the present invention, there is provided a speech coding apparatus for coding an input speech on a fame-by-frame basis using an adaptive excitation source, which is generated from a past excitation source, and a driving excitation source, which is generated from the input speech and the adaptive excitation source, so as to generate speech code, the speech coding apparatus comprising: a repetition period pre-selecting unit for generating a plurality of candidates for a repetition period of the driving excitation source by multiplying a repetition period of the adaptive excitation source by a plurality of constant numbers, respectively, and for pre-selecting a predetermined number of candidates from all the candidates generated and furnishing the predetermined number of pre-selected candidates; a driving excitation source coding unit for providing both excitation source location information and excitation source polarity information that minimize a coding distortion, for each of the predetermined number of candidates for the repetition period of the driving excitation source, and for providing an evaluation value associated with the minimum coding distortion for each of the predetermined number of candidates; and a repetition period coding unit for comparing the evaluation values provided for the predetermined number of candidates for the repetition period of the driving excitation source from the driving excitation source coding unit with one another, for selecting one candidate from the predetermined number of candidates according to a comparison result, and for furnishing selection information indicating a selection result, excitation source location code indicating excitation source location information associated with the selected candidate for the repetition period of the driving excitation source, and polarity code indicating excitation source polarity information associated with the selected candidate.]

[In accordance with a preferred embodiment of the present invention, the repetition period pre-selecting unit pre-selects two candidates from all the candidates generated, and the repetition period coding unit encodes the selection result in one bit so as to generate 1-bit selection information.]

[In accordance with another preferred embodiment of the present invention, the repetition period pre-selecting unit includes a unit for comparing the repetition period of the adaptive excitation source with a predetermined threshold value, and for pre-selecting the predetermined number of candidates from all the candidates generated according to a comparison result.]

[In accordance with another preferred embodiment of the present invention, the repetition period pre-selecting unit includes a unit for generating a plurality of other adaptive excitation sources whose respective repetition periods equal to the plurality of candidates for the repetition period of the driving excitation source, respectively, and for pre-selecting the predetermined number of candidates from all the candidates generated according to a comparison between distances among the plurality of other adaptive excitation sources generated.]

[Preferably, the plurality of constant numbers, by which the repetition period of the adaptive excitation source is multiplied, includes ½ and 1.]

[In accordance with another aspect of the present invention, there is provided a speech decoding apparatus for decoding input speech code on a fame-by-frame basis using an adaptive excitation source, which is generated from a past excitation source, and a driving excitation source, which is generated from the input speech code and the adaptive excitation source, so as to reconstruct original speech, the speech decoding apparatus comprising: a repetition period pre-selecting unit for providing a plurality of candidates for a repetition period of the driving excitation source by multiplying a repetition period of the adaptive excitation source by a plurality of constant numbers, respectively, and for pre-selecting a predetermined number of candidates from all the candidates generated and furnishing the predetermined number of pre-selected candidates; a repetition period decoding unit for selecting one candidate from the predetermined number of pre-selected candidates for the repetition period of the driving excitation source from the repetition period pre-selecting unit according to selection information included in the input coded speech and indicating the selection, and for furnishing the selected candidate as the repetition period of the driving excitation source; and a driving excitation source decoding unit for generating a time-series signal according to excitation source location code and excitation source polarity code included in the input speech code, and for generating a time-series vector that is a series of pitch-cycles, each of which includes the time-series signal, using the repetition period of the driving excitation source from the repetition period decoding unit.]

[In accordance with a preferred embodiment of the present invention, the repetition period pre-selecting unit pre-selects two candidates from all the candidates generated, and the repetition period decoding unit decodes selection information coded in one bit, which is included in the input speech code and indicates a selection of a candidate for the repetition period of the adaptive excitation source made during coding.]

[In accordance with another preferred embodiment of the present invention, the repetition period pre-selecting unit includes a unit for comparing the repetition period of the adaptive excitation source with a predetermined threshold value, and for pre-selecting the predetermined number of candidates from all the candidates generated according to a comparison result.]

[In accordance with another preferred embodiment of the present invention, the repetition period pre-selecting unit includes a unit for generating a plurality of other adaptive excitation sources whose respective repetition periods equal to the plurality of candidates for the repetition period of the driving excitation source, respectively, and for pre-selecting the predetermined number of candidates from all the candidates generated according to a comparison between distances among the plurality of other adaptive excitation sources generated.]

[Preferably, the plurality of constant numbers, by which the repetition period of the adaptive excitation source is multiplied, includes ½ and 1.]

[In accordance with a further aspect of the present invention, there is provided a speech coding apparatus for coding an input speech on a fame-by-frame basis using an adaptive excitation source, which is generated from a past excitation source, and a driving excitation source, which is generated from the input speech and the adaptive excitation source, so as to generate speech code, the speech coding apparatus comprising: a perceptual weighting control unit for determining a perceptual weighting strength coefficient based on a repetition period of the adaptive excitation source; and a driving excitation source coding unit for generating excitation source location code indicating information about excitation source locations and information about excitation source polarities based on the repetition period of the adaptive excitation source, the perceptual weighting strength coefficient determined by the perceptual weighting control unit, and a signal to be coded such as the input speech.]

[In accordance with a preferred embodiment of the present invention, the perceptual weighting control unit determines the perceptual weighting strength coefficient based on an average of the repetition period of the current adaptive excitation source and repetition periods of previously-generated adaptive excitation sources.]

[In accordance with another aspect of the present invention, there is provided a speech coding apparatus for coding an input speech on a fame-by-frame basis using an adaptive excitation source, which is generated from a past excitation source, and a driving excitation source generated from the input speech and the adaptive excitation source, the driving excitation source being represented by locations and polarities of a plurality of excitation sources, so as to generate speech code, the speech coding apparatus comprising: an excitation source location table including a plurality of selectable possible locations and a fixed magnitude determined based on the number of the plurality of possible locations for each of the plurality of excitation sources; a driving excitation source coding unit for placing the plurality of excitation sources at respective possible locations while multiplying each of the plurality of excitation sources by a corresponding fixed magnitude, with reference to the excitation source location table, for generating a driving excitation source by calculating a sum of the plurality of excitation sources each of which has been multiplied by the corresponding fixed magnitude and is thus placed at one corresponding possible location, for each of all combinations of possible locations of the plurality of excitation sources, and for selecting possible locations and polarities of the plurality of excitation sources which provide a driving excitation source having a smallest coding distortion between itself and the input speech so as to generate excitation source location code and polarity code.]

[In accordance with a further aspect of the present invention, there is provided a speech decoding apparatus for decoding input speech code on a fame-by-frame basis using an adaptive excitation source, which is generated from a past excitation source, and a driving excitation source generated from the input speech code and the adaptive excitation source, the driving excitation source being represented by locations and polarities of a plurality of excitation sources, so as to reconstruct original speech, the speech decoding apparatus comprising: an excitation source location table including a plurality of selectable possible locations and a fixed magnitude determined based on the number of the plurality of possible locations for each of the plurality of excitation sources; a driving excitation source decoding unit for selecting respective possible locations for the plurality of excitation sources with reference to the excitation source location table based on excitation source location code included in the input speech code, for placing the plurality of excitation sources at the respective selected possible locations while multiplying each of the plurality of excitation sources by a corresponding fixed magnitude, and for generating a driving excitation source by calculating a sum of the plurality of excitation sources each of which has been multiplied by the corresponding fixed magnitude and is thus placed at the corresponding possible location.]

In accordance with [another] *an* aspect of the present invention, there is provided a speech coding apparatus for coding an input speech on a fame-by-frame basis using an adaptive excitation source, which is generated from a past excitation source, and a driving excitation source [generated from the input speech and the adaptive excitation source, the driving excitation source being represented by locations and polarities of a plurality of excitation sources], *which includes a predetermined number of pulse locations and polarities being associated with the pulse locations,* so as to generate speech code, the speech coding apparatus comprising: a [pre-table] *cross-correlation* calculating unit for calculating a *cross*-correlation between a [signal to be coded, such as the input speech, and each of a plurality of synthesized speeches each of which is generated based on a corresponding temporary driving excitation source that is a signal obtained by placing a predetermined excitation source at a corresponding one of all possible locations, and a cross-correlation between any two of the plurality of synthesized speeches, and for storing these calculated correlations and cross-correlations as a pre-table therein] *first impulse response generated when an impulse is placed at a first pulse location among a plurality of pulse locations and a second impulse response generated when an impulse is placed at a second pulse location among the plurality of pulse locations, for all combinations of the first and second pulse locations*; a [pre-table] *cross-correlation* modifying unit for calculating a correlation between [the signal to be coded] *an impulse response generated when an impulse is placed at a pulse location among the plurality of pulse locations* and a synthesized speech generated based on the adaptive excitation source, [and a correlation between each of the plurality of synthesized speeches generated based on the corresponding temporary driving excitation source and the synthesized speech generated based on the adaptive excitation source,] and for modifying the [pre-table using these calculated correlations] *cross-correlation calculated by the cross-correlation calculating unit, using the correlation*; and a searching unit for [determining the locations and polarities of the plurality of excitation sources using the pre-table corrected by the pre-table modifying unit so as to generate excitation source location code indicating the locations of the plurality of excitation sources and excitation source polarity code indicating the polarities of the plurality of excitation sources] *searching for each location of the predetermined number of the pulse locations of the driving excitation source, using the cross-correlation modified by the cross-correlation modifying unit. According to this aspect, the cross-correlation modifying unit may modify the cross-correlation by sub-*

*tracting a value based on a product of the correlations from a value based on the cross-correlation.*

Further objects and advantages of the present invention will be apparent from the following description of the preferred embodiments of the invention as illustrated in the accompanying drawings.

BRIEF DESCRIPTION OF THE DRAWINGS

FIG. 12 is a diagram showing an excitation source location table according to a fifth embodiment of the present invention;

FIG. 16 is a diagram showing candidates for the locations of prior art excitation source pulses;

DETAILED DESCRIPTION OF THE PREFERRED EMBODIMENTS

Embodiment 1

Figure 1:
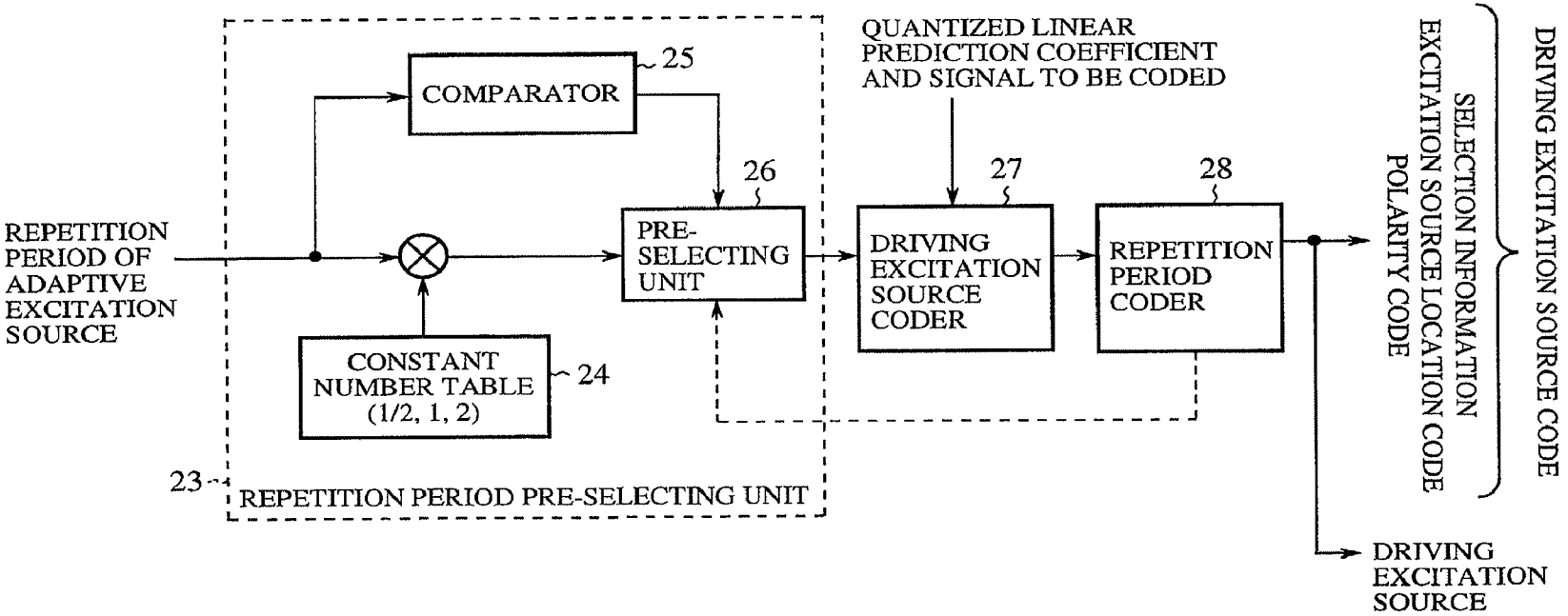
FIG. 1 is a block diagram showing the structure of a driving excitation source coding unit of a speech coding apparatus according to a first embodiment of the present invention.
Figure 14:
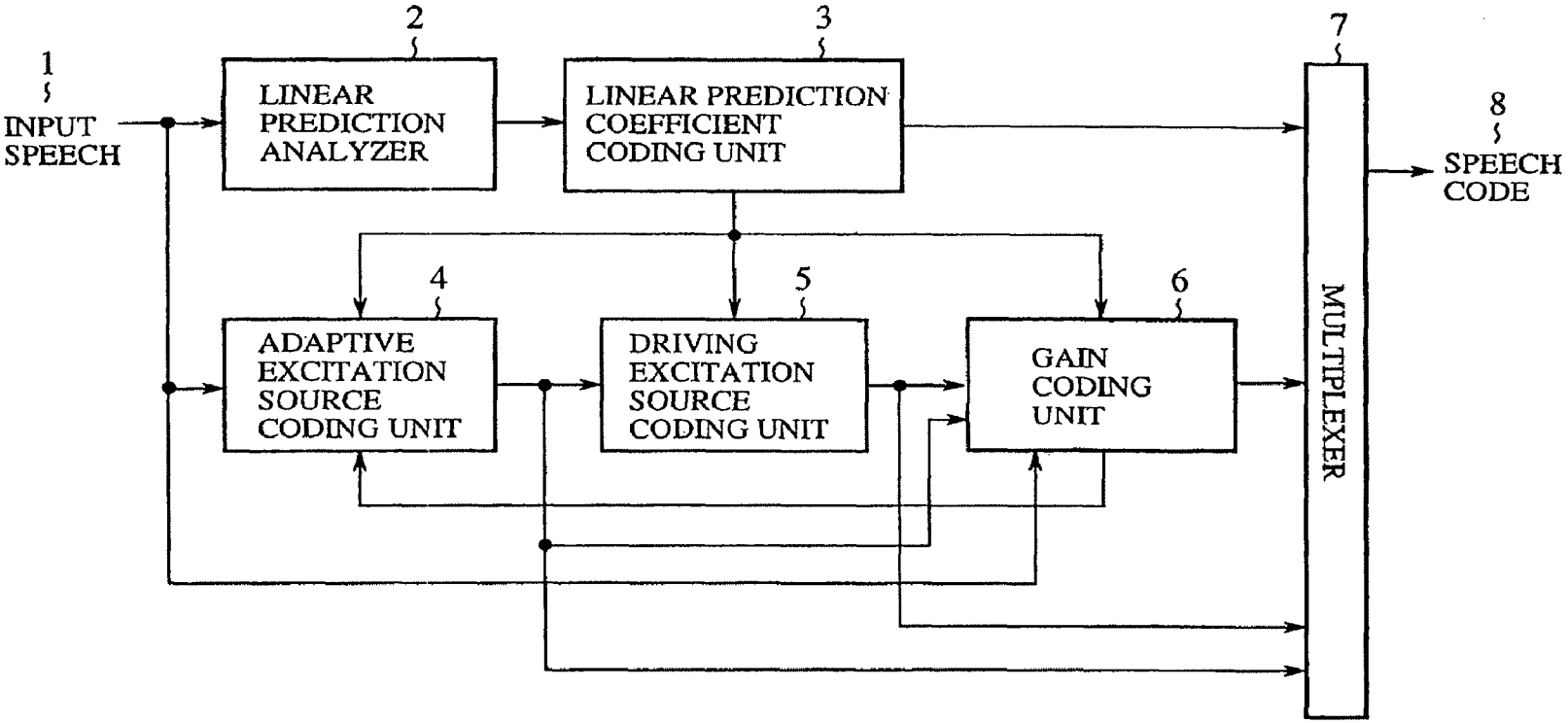
CONVENTIONAL ART FIG.14
FIG. 14 is a block diagram showing the structure of a prior art CELP speech coding apparatus.

Referring next to FIG. 1, there is illustrated a block diagram showing the structure of a driving excitation source coding unit of a speech coding apparatus in accordance with a first embodiment of the present invention. The speech coding apparatus has the same overall structure as shown in FIG. 14. In FIG. 1, reference numeral 23 denotes a repetition period pre-selecting unit, numeral 27 denotes a driving excitation source coder, and numeral 28 denotes a repetition period coder. The repetition period pre-selecting unit 23 includes a constant number table 24, a comparator 25, and a pre-selecting unit 26.

The driving excitation source coding unit 5 of the speech coding apparatus of this embodiment thus includes the driving excitation source coder 27 that operates in the same way that the prior art driving excitation source coding unit as mentioned above does, and the repetition period pre-selecting unit 23 and the repetition period coder 28 disposed in the front and back of the driving excitation source coder 27.

Figure 2:
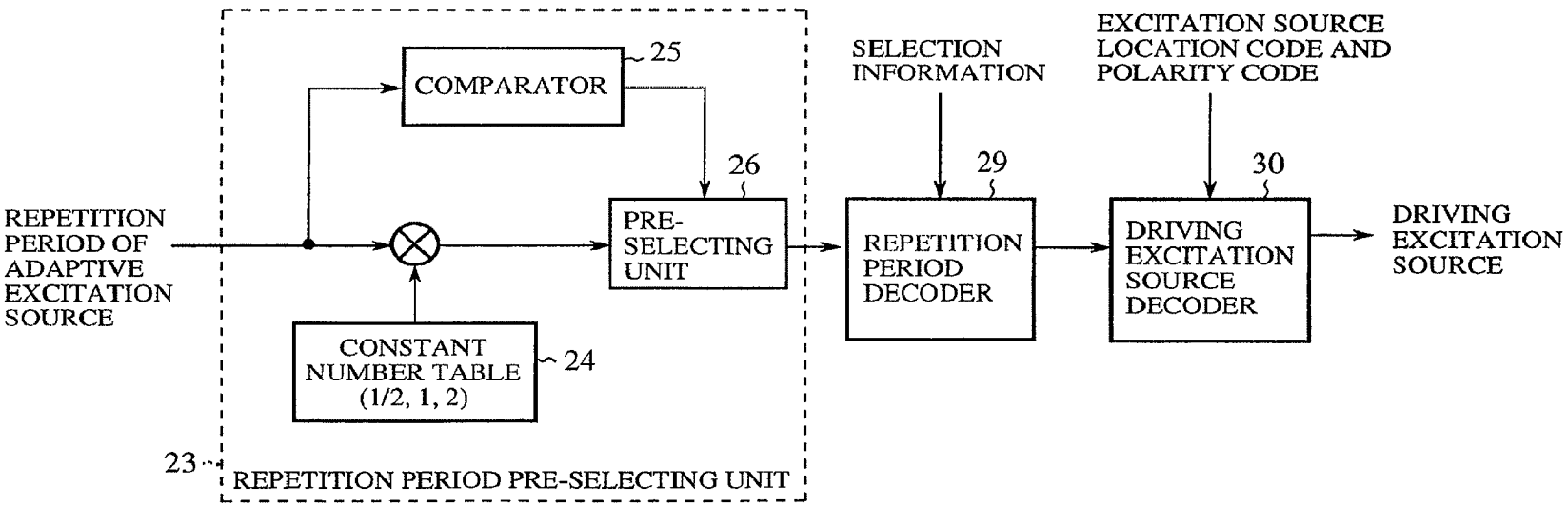
FIG. 2 is a block diagram showing the structure of a driving excitation source decoding unit of a speech decoding apparatus according to the first embodiment of the present invention.
Figure 15:
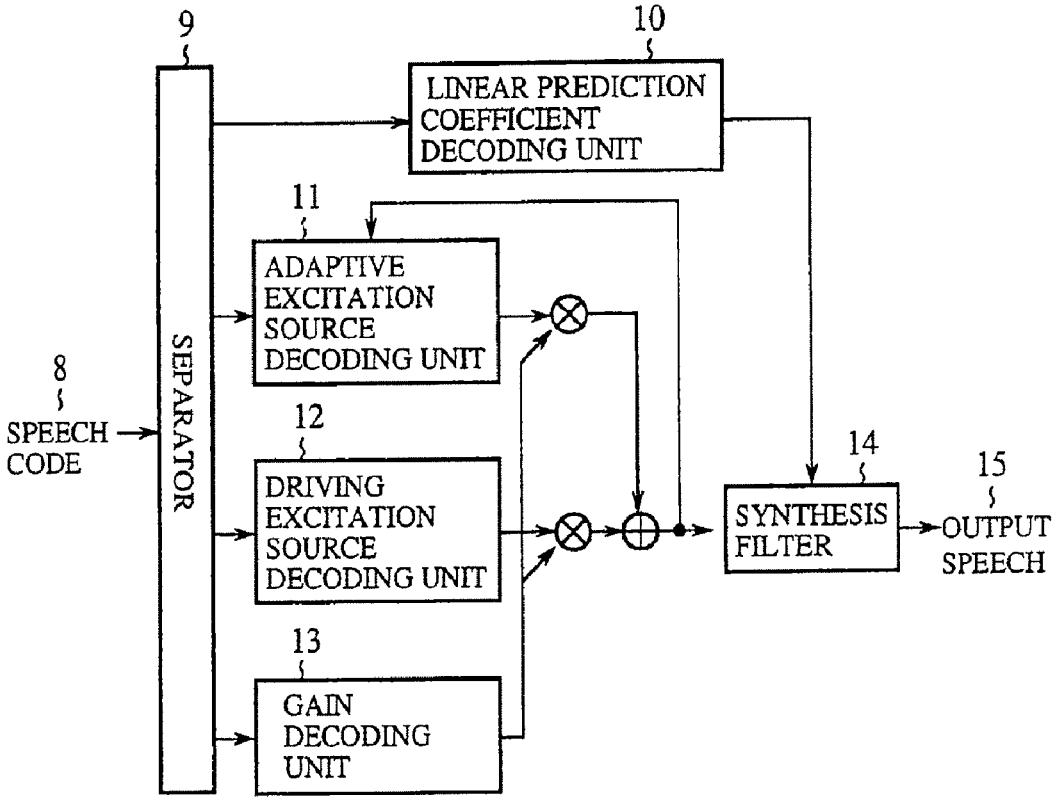
CONVENTIONAL ART FIG.15
FIG. 15 is a block diagram showing the structure of a prior art CELP speech decoding apparatus.

Referring next to FIG. 2, there is illustrated a block diagram showing the structure of a driving excitation source decoding unit of a speech decoding apparatus in accordance with the first embodiment of the present invention. The speech decoding apparatus has the same overall structure as shown in FIG. 15. In FIG. 2, reference numeral 29 denotes a repetition period decoder, and numeral 30 denotes a driving excitation source decoder.

The driving excitation source decoding unit 12 of the speech decoding apparatus of this embodiment thus includes the driving excitation source decoder 30 that operates in the same way that the prior art driving excitation source decoding unit as mentioned above does, and the repetition period pre-selecting unit 23 and the repetition period decoder 29 inserted in the front of the driving excitation source decoder 30.

Next, a description will be made as to the operation of the speech coding apparatus with reference to FIG. 1. An adaptive excitation source coding unit 4 can convert an adaptive excitation source code into the repetition period of an adaptive excitation source. The repetition period of the adaptive excitation source is then delivered to the repetition period pre-selecting unit 23. Both a signal to be coded from the adaptive excitation source coding unit 4 and a quantized linear prediction coefficient from a linear prediction coefficient coding unit 3 are input to the driving excitation source coder 27.

The constant number table 24 disposed within the repetition period pre-selecting unit 23 stores three constant numbers: ½, 1, and 2. The input repetition period of the adaptive excitation source is multiplied by the three constant numbers, respectively, and the three multiplication results are furnished as three candidates for the repetition period of the driving excitation source to the pre-selecting unit 26. The comparator 25 compares the thus inputted repetition periods of the driving excitation source with a predetermined threshold value, respectively, and furnishes the comparison results to the pre-selecting unit 26. An averaged pitch-period of about 40 can be used as the threshold value.

The pre-selecting unit 26 pre-selects the two possible repetition periods of the driving excitation source obtained by multiplying the input repetition period of the adaptive excitation source by ½ and 1 when the comparison results indicate that all the multiplication results are greater than the predetermined threshold value, and, otherwise, pre-selects the two possible repetition periods of the driving excitation source obtained by multiplying the input repetition period of the adaptive excitation source by 1 and 2. The pre-selecting unit 26 then delivers the two selected possible repetition periods of the driving excitation source to the driving excitation source coder 27 sequentially.

Figure 17:
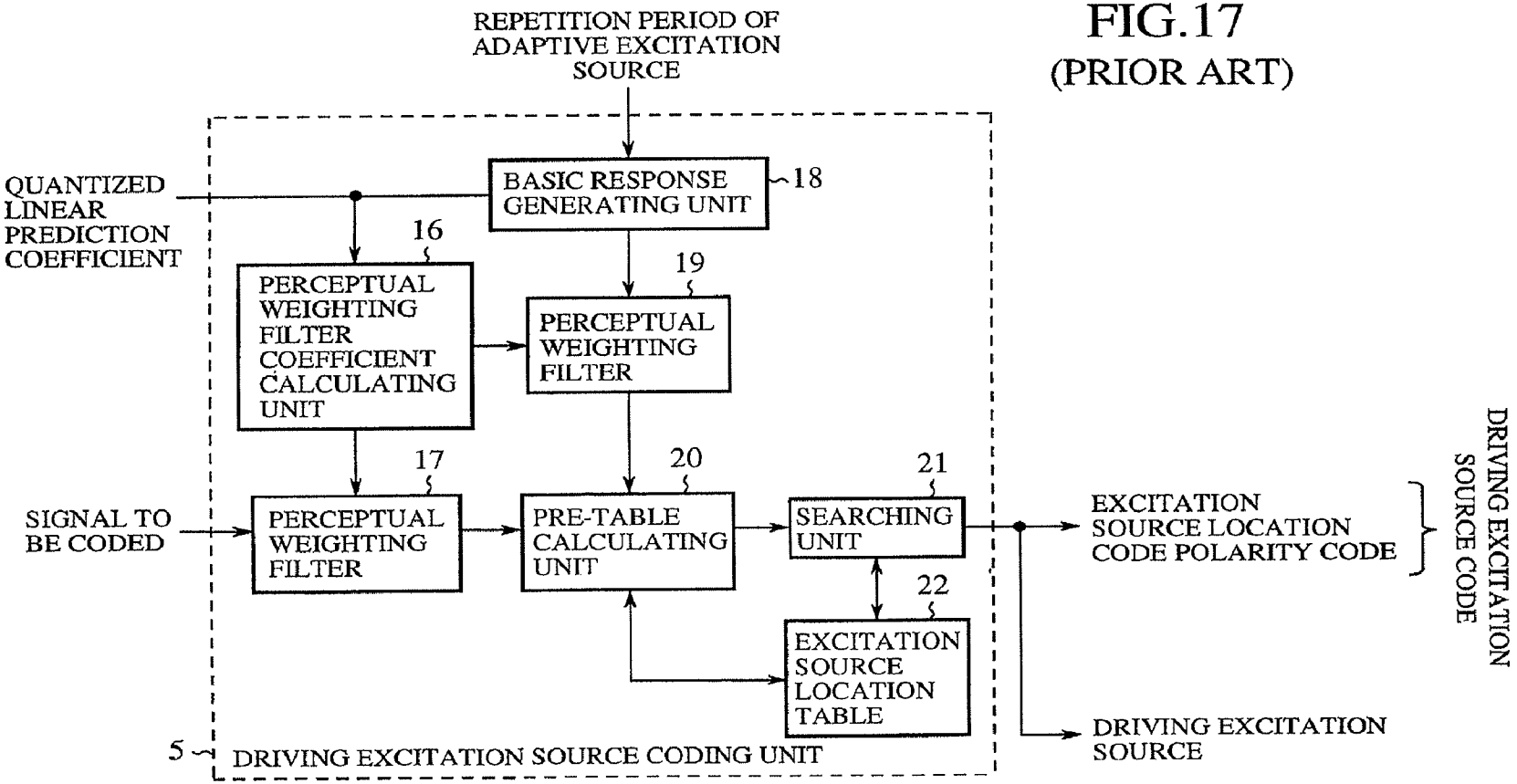
FIG.17 (PRIOR ART)
FIG. 17 is a block diagram showing in details the structure of a driving excitation source coding unit of a prior art CELP speech coding apparatus.

Like the prior art driving excitation source coding unit as shown in FIG. 17, the driving excitation source coder 27 can encode the algebraic excitation source using the two possible repetition periods of the driving excitation source, the quantized linear prediction coefficient, and the signal to be coded, and provide the locations of a plurality of excitation sources that minimize the coding distortion, each of the plurality of excitation sources consisting of either a fixed waveform or a pulse, the polarities of the plurality of excitation sources, and an evaluation value D associated with the coding distortion according to equation (1) described above, for each of the two possible repetition periods of the driving excitation source. The driving excitation source coder 27 differs from the prior art driving excitation source coding unit as shown in FIG. 17 in that each of the received candidates for the repetition period of the driving excitation source is the one obtained by multiplying the repetition period of the adaptive excitation source by a constant number.

The repetition period coder 28 compares the two evaluation values D obtained for the two possible repetition periods of the driving excitation source from the driving excitation source coder 27 with each other. If the difference between them is equal to or greater than a predetermined threshold value, that is, if one of them indicates that the corresponding possible repetition period exhibits a smaller coding distortion, the repetition period coder 28 selects the possible repetition period of the driving excitation source providing the evaluation value D. In contrast, when the difference between the two calculated evaluation values is less than the predetermined threshold value, the repetition period coder 28 selects one possible repetition period of the driving excitation source that is the closest to an estimate of the pitch-period of an input speech which was separately made through analysis. In either case, the repetition period coder 28 furnishes selection information coded in one bit indicating the selection result, and excitation source location code indicating the locations of the plurality of excitation sources from the driving excitation source coder 27, and polarity code indicating the polarities of the plurality of excitation sources as driving excitation source code to a multiplexer 7 as shown in FIG. 14. The repetition period coder 28 also furnishes a time-series vector associated with the driving excitation source code, as a driving excitation source, to a gain coding unit 6 as shown in FIG. 14.

The description will be directed to the operation of the speed decoding apparatus with reference to FIG. 2. In the speech decoding apparatus having the same overall structure as shown in FIG. 15, a separator 9 separates speech code 8 output from the speech coding apparatus into linear prediction coefficient code, adaptive excitation source code, driving excitation source code, and gain code. The separator 9 then delivers the linear prediction coefficient code to a linear prediction coefficient decoding unit 10, the adaptive excitation source code to an adaptive excitation source decoder 11, the driving excitation source code to the driving excitation source decoding unit 12, and the gain code to a gain decoding unit 13. The adaptive excitation source decoding unit 11, as shown in FIG. 15, of the first embodiment converts the adaptive excitation source code to the repetition period of the adaptive excitation source and furnishes it to the driving excitation source decoding unit 12. In other words, the repetition period of the adaptive excitation source from the adaptive excitation source decoding unit 11 is delivered to the repetition period pre-selecting unit 23 of FIG. 2. The selection information included in the driving excitation source code separated by the separator 9 is furnished to the repetition period decoder 29, and the excitation source location code and polarity code included in the driving excitation source code is furnished to the driving excitation source decoder 30.

The repetition period pre-selecting unit 23 of the speech decoding apparatus has the same structure as the repetition period pre-selecting unit as shown in FIG. 1 disposed within the speech coding apparatus. The pre-selecting unit 26 pre-selects two possible repetition periods of the driving excitation source from a plurality of possible repetition periods of the driving excitation source obtained by multiplying the input repetition period of the adaptive excitation source by a plurality of constant numbers, according to comparison results from the comparator 25, and furnishes the pre-selected two candidates for the repetition period of the driving excitation source to the repetition period decoder 29.

The repetition period decoder 29 selects one of the pre-selected two possible repetition periods of the driving excitation source from the pre-selecting unit 26 according to the input selection information. The repetition period decoder 29 then delivers the finally-selected possible repetition period of the driving excitation source as the repetition period of the driving excitation source to the driving excitation source decoder 30. Like the prior art driving excitation source decoding unit mentioned above, the driving excitation source decoder 30 places a plurality of fixed waveforms or pulses at a plurality of locations defined by the excitation source location code, respectively, and performs a pitch-filtering process on the plurality of fixed waveforms or pulses based on the repetition period of the driving excitation source so as to generate a series of pitch-cycles each of which includes the plurality of fixed waveforms or pulses. The driving excitation source decoder 30 then outputs the time-series vector associated with the driving excitation source code as a driving excitation source.

Figure 3:
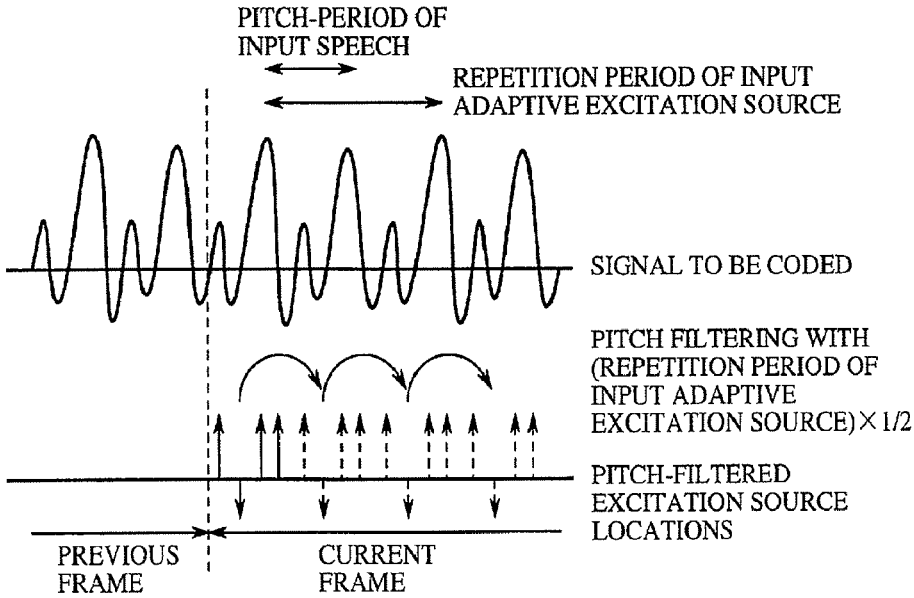
FIG. 3 is a diagram showing a relationship between a signal to be coded and the locations of pulses of each of a series of cycles included in a cyclic adaptive excitation source, when the repetition period of the adaptive excitation source is two times the pitch-period of an input speech, in accordance with the first embodiment of the present invention.
Figure 4:
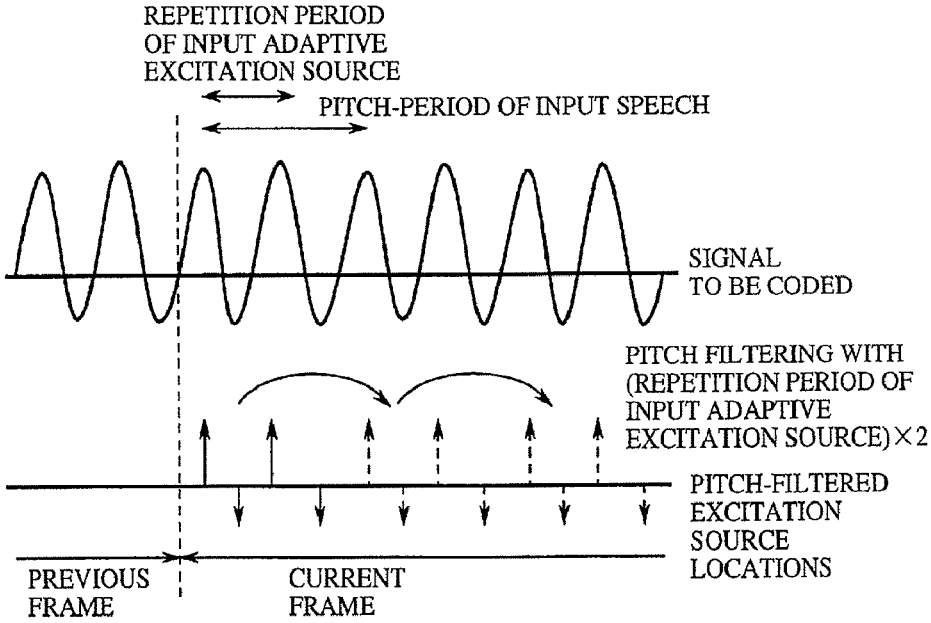
FIG. 4 is a diagram showing a relationship between the signal to be coded and the locations of pulses of each of a series of cycles included in a cyclic adaptive excitation source, when the repetition period of the adaptive excitation source is one-half the pitch-period of an input speech, in accordance with the first embodiment of the present invention.
Figure 18:
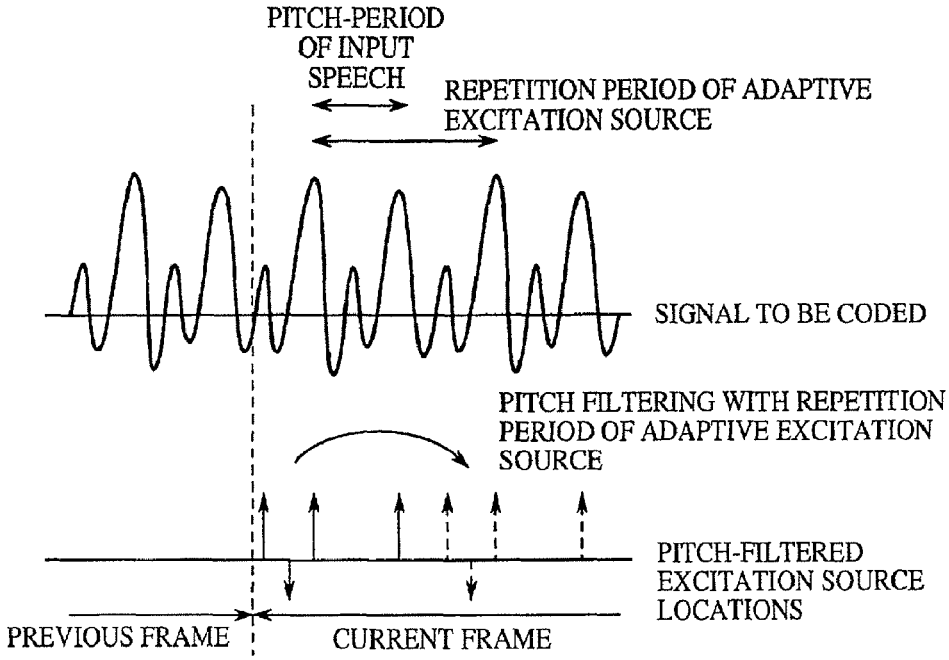
FIG.18 (PRIOR ART)
FIG. 18 is a diagram showing a relationship between a signal to be coded and the locations of pulses included in each pitch-cycle of a pitch-filtered driving excitation source, when the repetition period of the adaptive excitation source is two times the pitch-period of an input speech, in accordance with a prior art speech coding apparatus and a prior art speech decoding apparatus.
Figure 19:
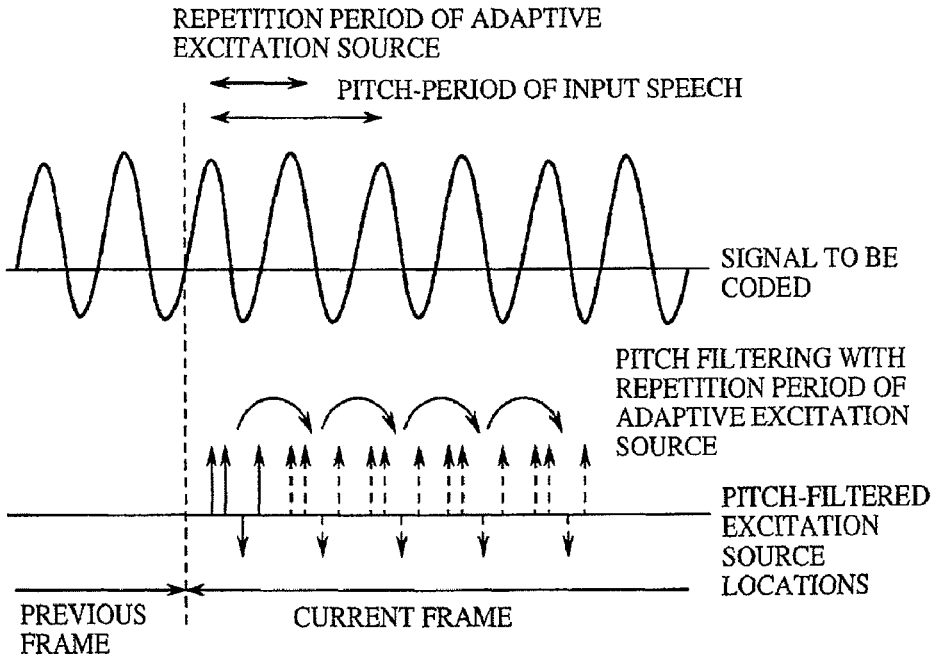
FIG.19 (PRIOR ART)
FIG. 19 is a diagram showing a relationship between a signal to be coded and the locations of pulses included in each pitch-cycle of a pitch-filtered driving excitation source, when the repetition period of the adaptive excitation source is one-half the pitch-period of an input speech, in accordance with a prior art speech coding apparatus and a prior art speech decoding apparatus.

Referring next to FIGS. 3 and 4, there are illustrated diagrams for explaining a relationship between the signal to be coded and the pitch-filtered driving excitation source locations, i.e., the locations of pulses (or fixed waveforms) placed in each pitch-cycle of the driving excitation source, in the speech coding apparatus and the speech decoding apparatus according to the first embodiment of the present invention, respectively. The signal to be coded as shown in FIG. 3 is the same as that as shown in FIG. 18, and the signal to be coded as shown in FIG. 4 is the same as that as shown in FIG. 19. FIG. 3 shows the case where the repetition period of the adaptive excitation source is approximately twice as large as the pitch-period of the input speech. FIG. 4 shows the case where the repetition period of the adaptive excitation source is approximately one-half the pitch-period of the input speech.

In the case of FIG. 3, since the repetition period of the adaptive excitation source is equal to or greater than 40 when the pitch-period of the input speech is equal to or greater than 20, the pre-selecting unit 26 pre-selects two values one-half and equal to the repetition period of the adaptive excitation source in most cases. When the difference between the evaluation values calculated during coding for the two pre-selected possible repetition periods of the driving excitation source is less than the predetermined threshold value, the repetition period decoder 29 then selects the one one-half the repetition period of the adaptive excitation source that is closer to an estimate of the pitch-period of the input speech which was separately obtained through analysis in advance. In this case, ideal pitch-filtered excitation source locations can be obtained as shown in FIG. 3. The estimate of the pitch-period has a higher probability of being proper than the repetition period of the adaptive excitation source.

In the case of FIG. 4, since the repetition period of the adaptive excitation source is less than 40 when the pitch-period of the input speech is less than 80, the pre-selecting unit 26 selects two values equal to and twice as large as the repetition period of the adaptive excitation source in most cases. When the difference between the evaluation values calculated during coding for the two selected repetition periods of the driving excitation source is less than the predetermined threshold value, the repetition period decoder 29 then selects the one twice as large as the repetition period of the adaptive excitation source which is closer to the estimate of the pitch-period of the input speech which was separately obtained through analysis in advance. In this case, ideal periodic excitation source locations can be obtained as shown in FIG. 4.

Numerous variants may be made in the exemplary embodiment shown. As previously mentioned, an algebraic excitation source represented with the locations and polarities of a number of fixed waveforms or pulses, can be used when coding the driving excitation source and when decoding the driving excitation source code, and the present invention is, however, not limited to the structure in which the algebraic excitation source is used. The present invention can be applied to a CELP speech coding apparatus and a CELP speech decoding apparatus using a learning excitation source code book, a random excitation source code book, or the like.

Instead of the use of an estimate of the pitch-period which was separately obtained in advance, the repetition period coder 28 can select one possible repetition period of the driving excitation source that minimizes the coding distortion, i.e., maximizes the evaluation value D. As an alternative, a value obtained by averaging the repetition periods of the adaptive excitation source obtained for a few past frames can be used instead of the pitch-period.

Instead of the linear prediction coefficient, another spectral parameter, such as a line spectrum pair (LSP) widely used, can be used.

Instead of multiplying the repetition period of the adaptive excitation source by all constant numbers located within the constant number table 24, the repetition period pre-selecting unit 23 can select two constant numbers from the constant number table 26 and, after that, multiply the repetition period of the adaptive excitation source by the two selected constant numbers, respectively, to generate two possible repetition periods of the driving excitation source. In another variant, 1 can be eliminated from the constant number table 24, and the repetition period of the adaptive excitation source can be delivered directly to the pre-selecting unit 26. Although the performance improvement is reduced, the comparator 25 and the pre-selecting unit 26 can be eliminated in a case where the constant number table 25 includes ½ and 1 only.

As previously mentioned, in accordance with the first embodiment of the present invention, the speech coding apparatus generates a plurality of candidates for the repetition period of the driving excitation source by multiplying the repetition period of the adaptive excitation source by a plurality of constant numbers, respectively, pre-selects a predetermined number of candidates from all the candidates generated, searches for excitation source code that minimizes a coding distortion for each of the predetermined number of candidates for the repetition period of the driving excitation source, and selects one candidate from the predetermined number of candidates according to comparison results obtained by comparing coding distortions provided for the predetermined number of candidates with a predetermined threshold value, respectively. Accordingly, the speech coding apparatus can perform a pitch-filtering process so as to generate a pitch-filtered driving excitation source using the repetition period having a high probability of being the closest to the pitch-period of the input speech even when the pitch-period of the input speech is different from the repetition period of the adaptive excitation source, thereby reducing the probability of occurrence of unstability in the synthesized speech. The speech coding apparatus of the present embodiment can generate high-quality speech code.

The repetition period pre-selecting unit pre-selects two candidates or possible repetition periods of the driving excitation source, and the repetition period coding unit encodes the selection information in one bit. Accordingly, the speech coding apparatus of the present embodiment can generate high-quality speech code only with a minimum additional amount of information.

In addition, the repetition period pre-selecting unit compares the repetition period of the adaptive excitation source with a predetermined threshold value and pre-selects a predetermined number of candidates for the repetition period of the driving excitation source from all candidates according to the comparison result. Accordingly, the repetition period pre-selecting unit can reject one or more candidates for the repetition period of the driving excitation source having a lower probability of being the closest to the pitch-period of the input speech, thus eliminating driving excitation source coding processes for the rejected candidates that don't need evaluations and reducing the required amount of the selection information to be coded. Accordingly, the speech coding apparatus of the present embodiment can generate high-quality speech code only with a minimum additional amount of operations and a minimum additional amount of information.

Furthermore, since the plurality of constant numbers by which the repetition period of the adaptive excitation source is multiplied in the repetition period pre-selecting process includes ½ and 1, a number of candidates for the repetition period of the driving excitation source including the one that is the closest to the pitch-period of the input speech can be selected with a high probability while those choices are few. Accordingly, the speech coding apparatus of the present embodiment can generate high-quality speech code only with a minimum additional amount of operations and a minimum additional amount of information.

As previously mentioned, in accordance with the first embodiment of the present invention, the speech decoding apparatus generates a plurality of candidates for the repetition period of the driving excitation source by multiplying the repetition period of the adaptive excitation source by a plurality of constant numbers, pre-selects a predetermined number of candidates from all the candidates generated, further selects one candidate as the repetition period of the driving excitation source from the predetermined number of candidates pre-selected according to the selection information located within the speech code, the selection information indicating the selection of one possible repetition period of the driving excitation source made during coding, and decodes the driving excitation source code using the repetition period of the driving excitation source to reconstruct a driving excitation source. Accordingly, the speech decoding apparatus can generate a driving excitation source that is a series of pitch-cycles using the repetition period having a high probability of being the closest to the pitch-period of the input speech even when the pitch-period of the input speech code is different from the repetition period of the adaptive excitation source, thereby reducing the probability of occurrence of unstability in the synthesized speech. The speech decoding apparatus of the present embodiment can reconstruct a high-quality speech.

The repetition period pre-selecting unit pre-selects two candidates or possible repetition periods of the driving excitation source, and the repetition period decoding unit decodes the selection information coded in one bit and indicating the selection of one possible repetition period of the driving excitation source made during coding. Accordingly, the speech decoding apparatus of the present embodiment can generate a high-quality speech only with a minimum additional amount of information.

In addition, the repetition period pre-selecting unit compares the repetition period of the adaptive excitation source with a predetermined threshold value and pre-selects a predetermined number of candidates for the repetition period of the driving excitation source from all candidates according to the comparison result. Accordingly, the repetition period pre-selecting unit can reject one or more candidates for the repetition period of the driving excitation source having a low probability of being the closest to the pitch-period of the input speech code, thus reducing the required amount of the selection information by one or more bits required for the rejected candidates for the repetition period of the driving excitation source, which don't need evaluations. Accordingly, the speech decoding apparatus of the present embodiment can reconstruct a high-quality speech only with a minimum additional amount of operations and a minimum additional amount of information.

Furthermore, since the plurality of constant numbers by which the repetition period of the adaptive excitation source is multiplied in the repetition period pre-selecting process includes ½ and 1, a number of candidates for the repetition period of the driving excitation source including the one that is the closest to the pitch-period of the input speech code can be selected with a high probability while those choices are few. Accordingly, the speech decoding apparatus of the present embodiment can generate a high-quality speech only with a minimum additional amount of operations and a minimum additional amount of information.

Embodiment 2

Figure 5:
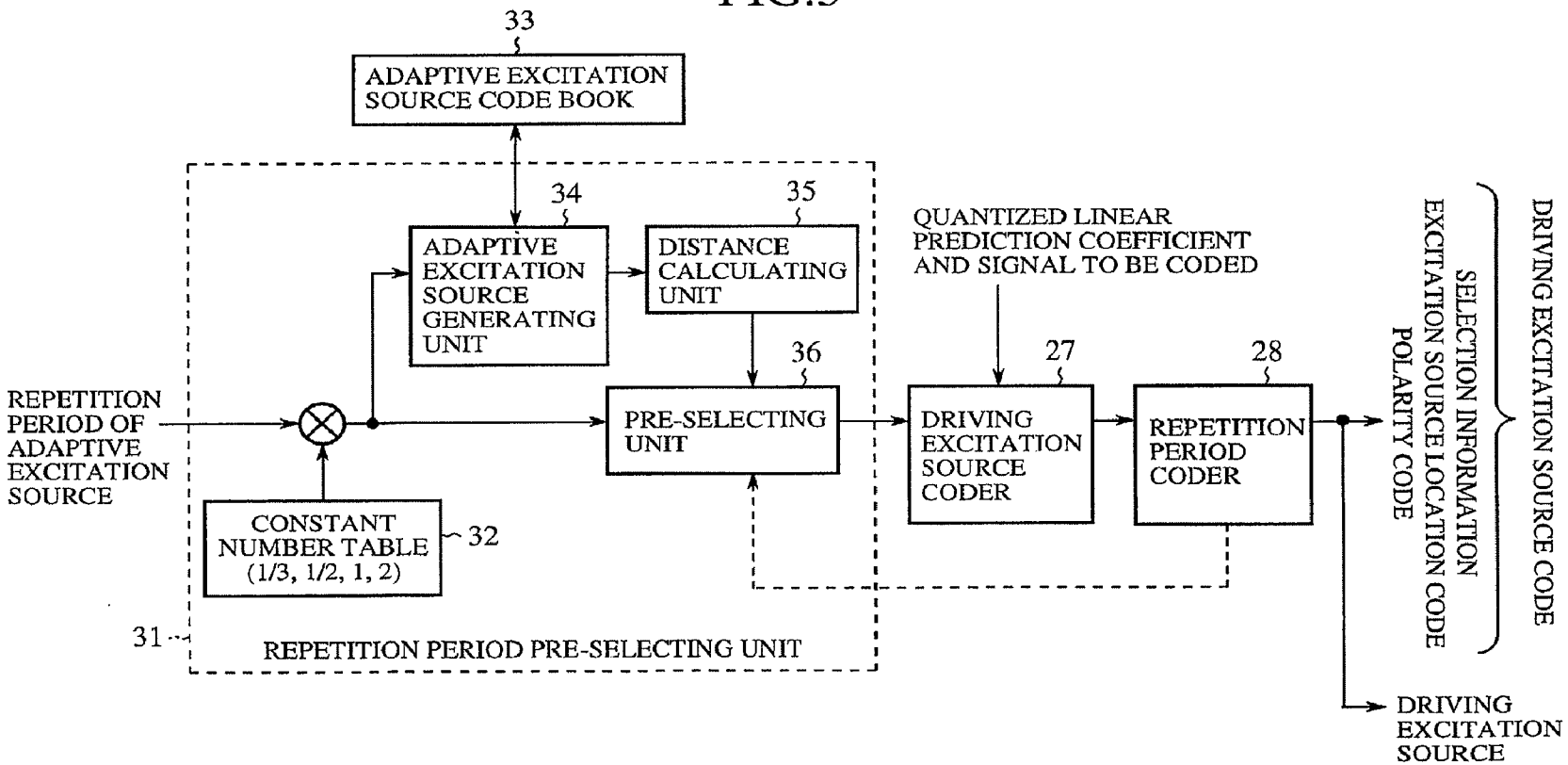
FIG. 5 is a block diagram of a driving excitation source coding unit of a speech coding apparatus according to a second embodiment of the present invention.

Referring next to FIG. 5, there is illustrated a block diagram of a driving excitation source coding unit of a speech coding apparatus according to a second embodiment of the present invention. The overall structure of the speech coding apparatus of this embodiment is the same as that of the aforementioned first embodiment as shown in FIG. 14. In FIG. 5, reference numeral 31 denotes a repetition period pre-selecting unit, and numeral 33 denotes an adaptive excitation source code book contained in an adaptive excitation source coding unit 4. The repetition period pre-selecting unit 31 includes a constant number table 32, an adaptive excitation source generating unit 34, a distance calculating unit 35, and a pre-selecting unit 36.

The driving excitation source coding unit 5 of the speech coding apparatus of the second embodiment includes a driving excitation source coder 27 that operates in the same way that the prior art driving excitation source coding unit as mentioned above, and the additional repetition period pre-selecting unit 31 and the repetition period coder 28 disposed in the front and back of the driving excitation source coder 27.

Figure 6:
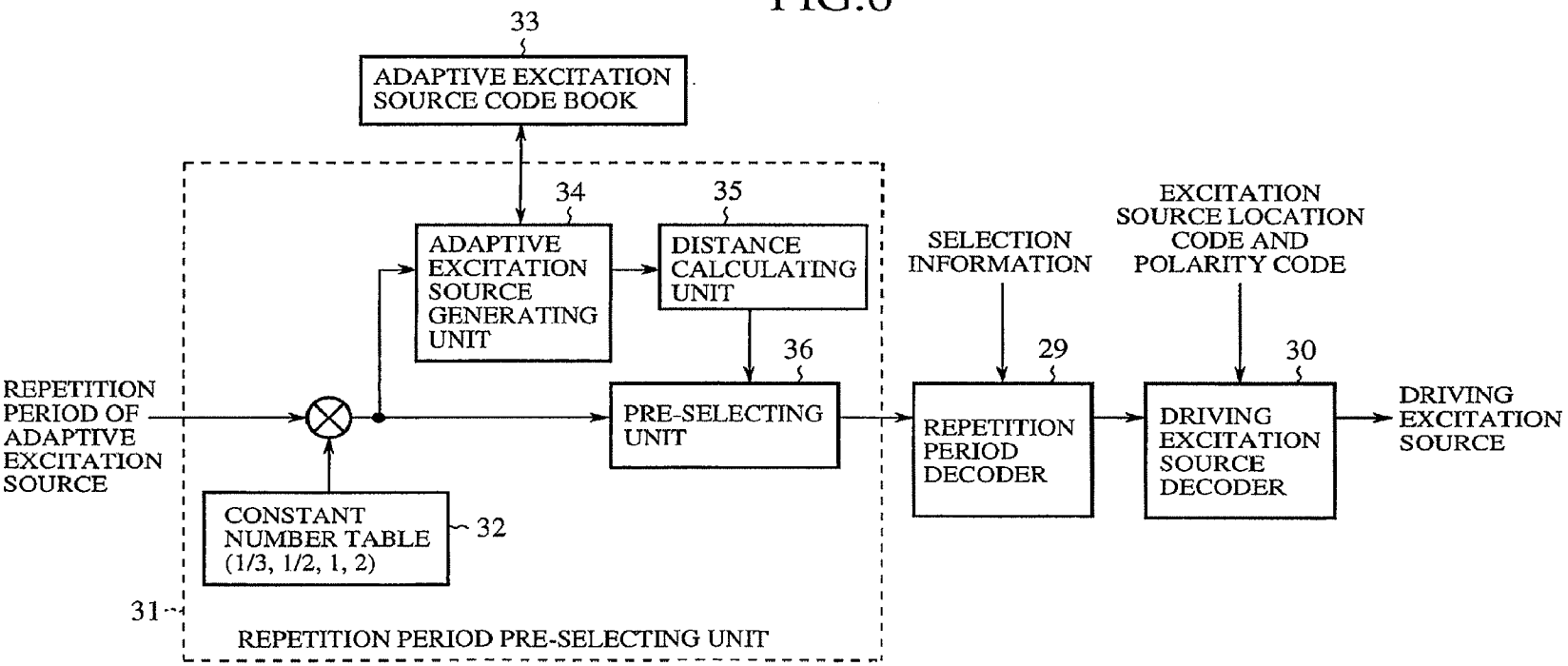
FIG. 6 is a block diagram showing the structure of a driving excitation source decoding unit of a speech decoding apparatus according to the second embodiment of the present invention.

FIG. 6 is a block diagram showing the structure of a driving excitation source decoding unit of a speech decoding apparatus according to the second embodiment of the present invention. The overall structure of the speech decoding apparatus is the same as that of the aforementioned first embodiment as shown in FIG. 15. In FIG. 6, reference numeral 33 denotes an adaptive excitation source code book stored in an adaptive excitation source decoding unit 11.

The driving excitation source decoding unit 12 of the speech coding apparatus of the second embodiment includes a driving excitation source decoder 30 that operates in the same way that the prior art driving excitation source decoding unit as mentioned above, and the additional repetition period pre-selecting unit 31 and the repetition period decoder 29 disposed in the front of the driving excitation source decoder 30.

Next, a description will be made as to the operation of the speech coding apparatus with reference to FIG. 5. Like the first embodiment, the adaptive excitation source coding unit 4 delivers the repetition period of the adaptive excitation source to the repetition period pre-selecting unit 31. A signal to be coded from the adaptive excitation source coding unit 4 and a quantized linear prediction coefficient from a linear prediction coefficient coding unit 3 are input to the driving excitation source coder 27.

The constant number table 32 of the repetition period pre-selecting unit 31 stores four constant numbers: ⅓, ½, 1, and 2. The input repetition period of the driving excitation source is multiplied by the four constant numbers, respectively, and the four multiplication results are furnished as possible repetition periods of the driving excitation source to the adaptive excitation source generating unit 34 and the pre-selecting unit 36.

The adaptive excitation source generating unit 34 generates four other adaptive excitation sources of different repetition periods which are equal to the four possible repetition periods of the driving excitation source, respectively, using a past excitation source stored in the adaptive excitation source code book 33, and furnishes the four other adaptive excitation sources generated to the distance calculating unit 35. The adaptive excitation source generating unit 34 can eliminate the generation of one possible repetition period equal to the repetition period of the adaptive excitation source input to the repetition period pre-selecting unit 31 because the adaptive excitation source coding unit 4 has already generated the adaptive excitation source of the same repetition period.

When some of the four possible repetition periods of the driving excitation source are too large or too small and therefore they are not suitable for the pitch-period, there is a possibility that adaptive excitation source code book cannot support for the generation of the four adaptive excitation sources. To avoid such a possibility, the adaptive excitation source generating unit 34 prevents one or more possible repetition periods of the driving excitation source not suitable for the pitch-period from being selected in the pre-selecting process by furnishing a zero signal or the like as each of one or more adaptive excitation sources associated with the one or more possible repetition periods of driving excitation source.

The distance calculating unit 35 calculates a distance between the third other adaptive excitation source having the same repetition period as the adaptive excitation source applied to the repetition period pre-selecting unit 31 (i.e., the adaptive excitation source output from the adaptive excitation source coding unit 4 of FIG. 14) and each of the first, second, and fourth other adaptive excitation sources having repetition periods one-third, one-half, and twice that of the input adaptive excitation source. The distance calculating unit 35 then furnishes the calculated distances to the pre-selecting unit 36.

The pre-selecting unit 36 first compares the distance between the third other adaptive excitation source and the first other adaptive excitation source having a repetition period one-third that of the third adaptive excitation source with the distance between the third other adaptive excitation source and the second other adaptive excitation source having a repetition period one-half that of the third adaptive excitation source, and pre-selects a shorter one of them. Then the pre-selecting unit 36 further compares the selected shorter distance with the product of an averaged magnitude of the plurality of other adaptive excitation sources and a certain constant number, and pre-selects the repetition period of the other adaptive excitation source providing the shorter distance, i.e., the repetition period being one-third or one-half that of the adaptive excitation source input from the adaptive excitation source coding unit 4, and the repetition period equal to that of the adaptive excitation source input from the adaptive excitation source coding unit 4 as two possible repetition periods of the driving excitation source when the selected shorter distance is less than the product of the averaged magnitude and the constant number. Otherwise, the pre-selecting unit 36 further compares the selected shorter distance with the distance between the third other adaptive excitation source and the fourth other adaptive excitation source having a repetition period twice that of the third adaptive excitation source, and pre-selects the repetition period of the adaptive excitation source providing a shorter one of those distances and the repetition period equal to that of the adaptive excitation source input from the adaptive excitation source coding unit 4 as two possible repetition periods of the driving excitation source. It is preferable that a positive value less than 1, e.g., about 0.1 is used as the constant number.

Like the prior art driving excitation source coding unit as shown in FIG. 17, the driving excitation source coder 27 can code an algebraic excitation source using the two possible repetition periods of the driving excitation source pre-selected by the pre-selecting unit, the quantized linear prediction coefficient, and the signal to be coded. The present invention differs from the prior art in that each of the two possible repetition periods of the driving excitation source is obtained by multiplying that of the adaptive excitation source input from the adaptive excitation source coding unit 4 by a constant number. The driving excitation source coder 27 searches for driving excitation source code that minimizes the coding distortion for each of the two possible repetition periods of the driving excitation source, and provides the locations and polarities of a plurality of excitation sources, and an evaluation value D associated with the coding distortion according to the equation (1) described above.

The repetition period coder 28 compares the respective evaluation values D for the two possible repetition periods of the driving excitation source from the driving excitation source coder 27. If the difference between them is equal to or greater than a predetermined threshold value, that is, if one of them indicates that the corresponding possible repetition period exhibits a smaller coding distortion, the repetition period coder 28 selects the possible repetition period of the driving excitation source providing the evaluation value D. In contrast, when the difference between the two calculated evaluation values is less than the predetermined threshold value, the repetition period coder 28 selects one possible repetition period of the driving excitation source that is the closest to the pitch-period obtained through analysis (i.e., an estimation result of the pitch-period of the input speech). In either case, the repetition period coder 28 furnishes select information coded in one bit indicating the selection result, excitation source location indicating the locations of the plurality of excitation sources, and polarity code indicating the polarities of the plurality of excitation sources as driving excitation source code to a multiplexer 7 as shown in FIG. 14.

The description will be directed to the operation of the speed decoding apparatus with reference to FIG. 6. Like the first embodiment mentioned above, the repetition period of the adaptive excitation source output from the adaptive excitation source decoding unit 11 is delivered to the repetition period pre-selecting unit 31. The selection information included in the driving excitation source code separated by a separator 9 is furnished to the repetition period decoder 29, and the excitation source location code and polarity code included in the driving excitation source code are furnished to the driving excitation source decoder 30.

The repetition period pre-selecting unit 31 of the speech decoding apparatus has the same structure as the repetition period pre-selecting unit as shown in FIG. 5 disposed within the speech coding apparatus. The pre-selecting unit 21 selects two possible repetition periods of the driving excitation source from a plurality of possible repetition periods of the driving excitation source obtained by multiplying the input repetition period of the driving excitation source by a plurality of constant numbers, and furnishes the selected two possible repetition periods to the repetition period decoder 29. The repetition period decoder 29 selects one of the selected two possible repetition periods of the driving excitation source from the pre-selecting unit 26 according to the input selection information. The repetition period decoder 29 then delivers the finally-selected possible repetition period of the driving excitation source as the repetition period of the driving excitation source to the driving excitation source decoder 30. Like the prior art driving excitation source decoding unit mentioned above, the driving excitation source decoder 30 places a plurality of fixed waveforms or pulses at respective locations defined by the excitation source location code and performs a pitch-filtering process on them placed at the locations based on the repetition period of the driving excitation source. The driving excitation source decoder 30 also delivers a time-series vector associated with the driving excitation source code as the driving excitation source.

Figure 7:
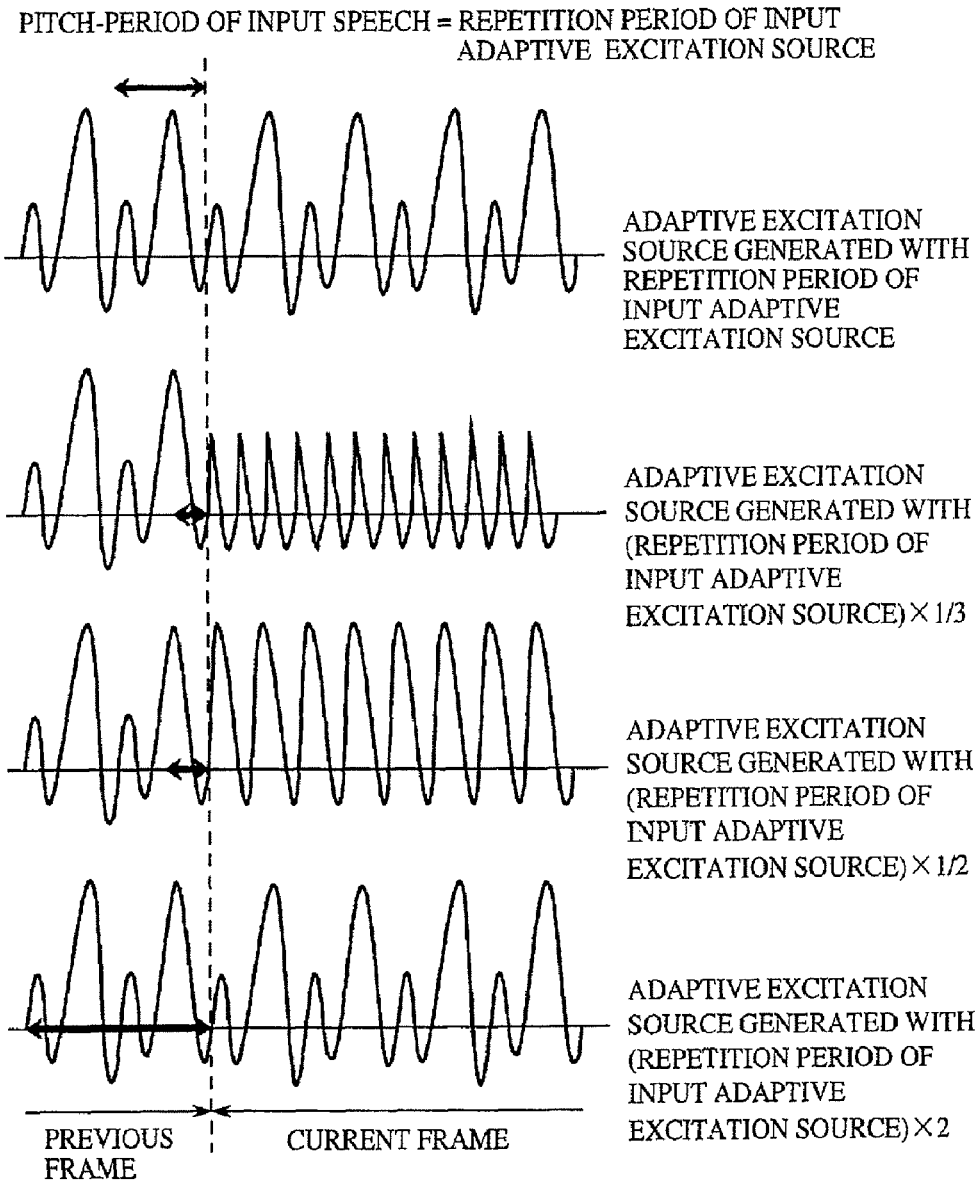
FIG. 7 is a diagram showing other adaptive excitation sources generated by an adaptive excitation source generating unit of the speech decoding apparatus according to the second embodiment of the present invention when the repetition period of an original adaptive excitation source is equal to the pitch-period of an input speech.
Figure 8:
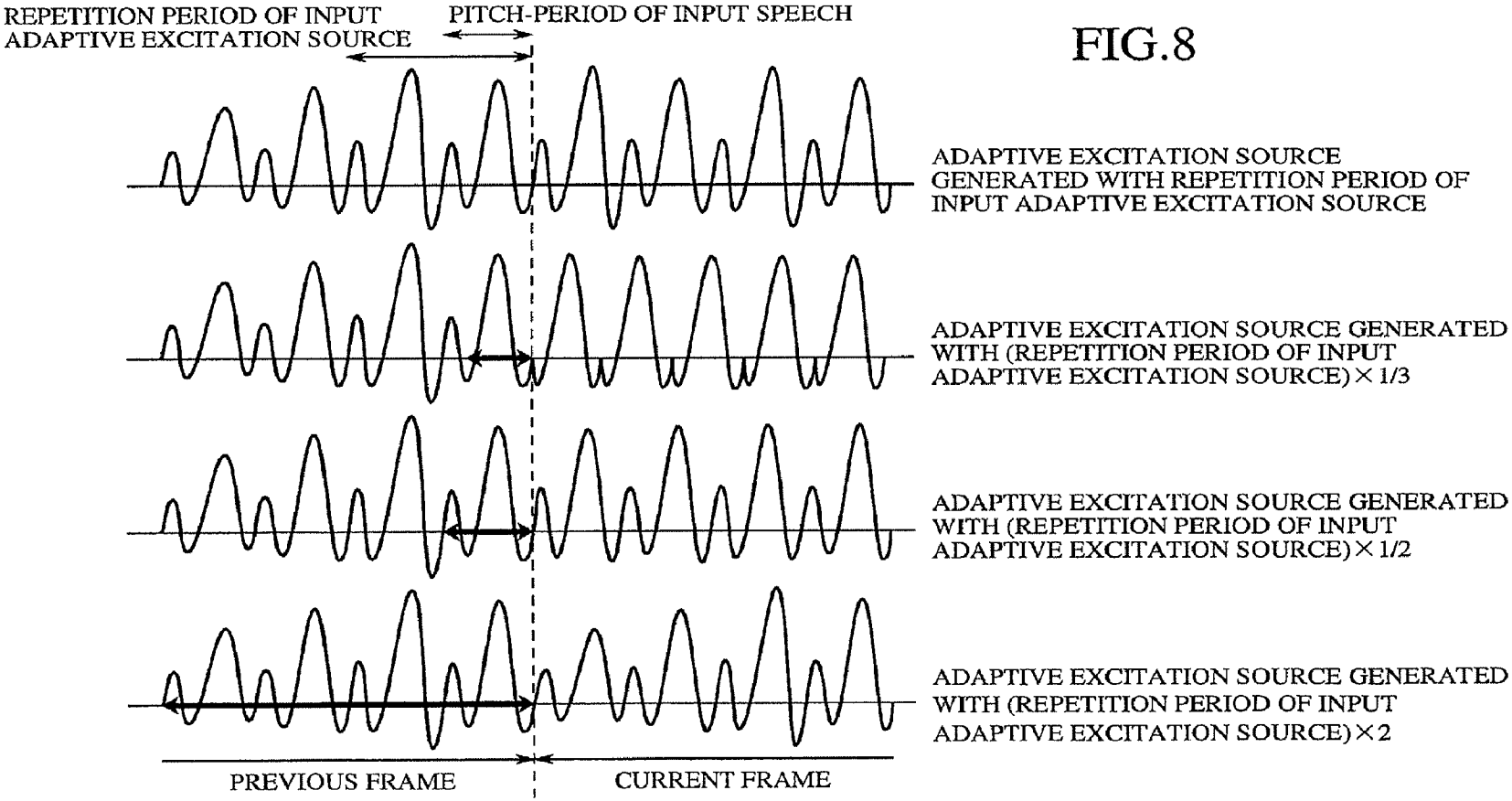
FIG. 8 is a diagram showing other adaptive excitation sources generated by the adaptive excitation source generating unit of the speech decoding apparatus according to the second embodiment of the present invention when the repetition period of an original adaptive excitation source is twice the pitch-period of an input speech.
Figure 9:
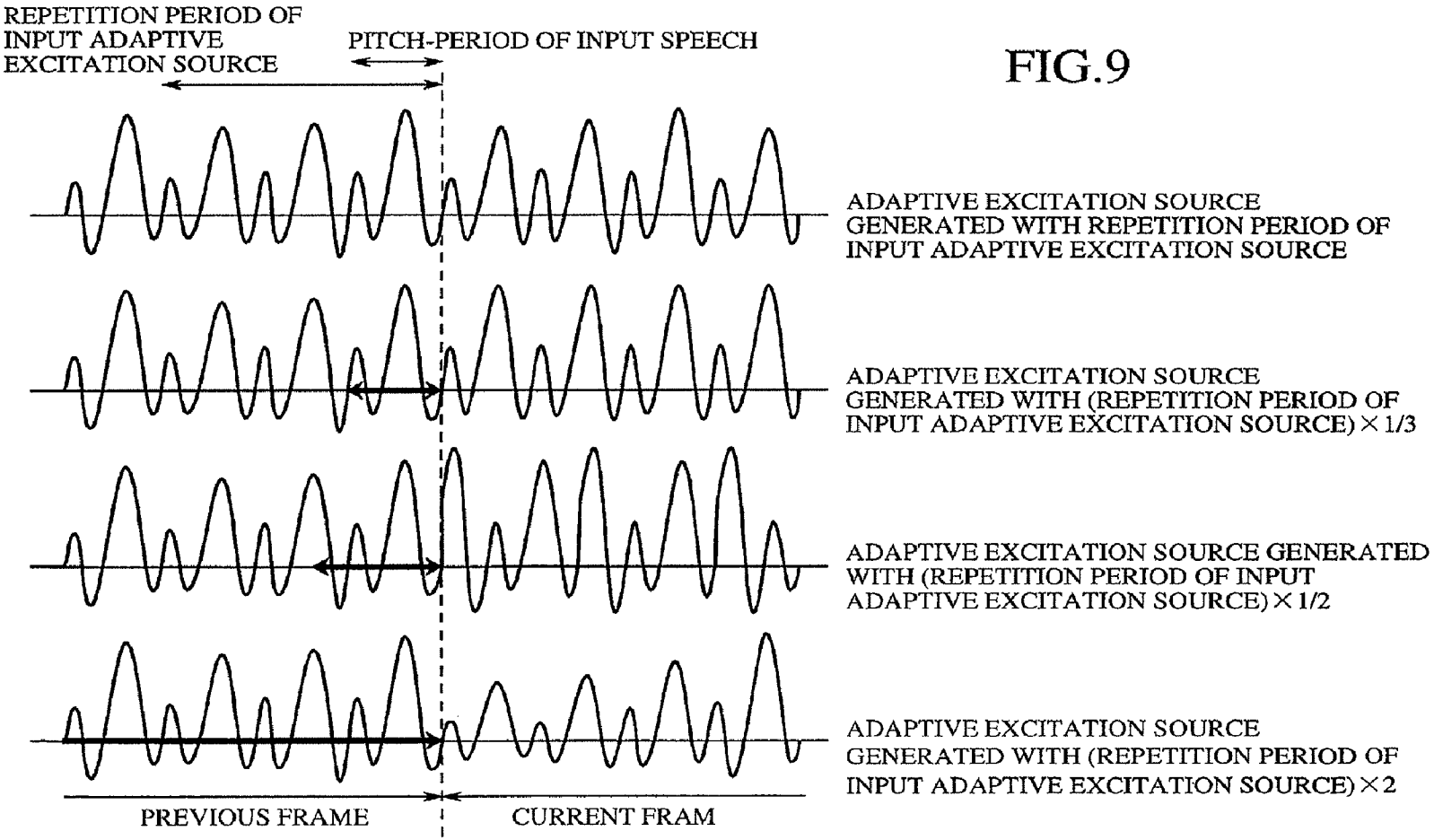
FIG. 9 is a diagram showing other adaptive excitation sources generated by the adaptive excitation source generating unit of the speech decoding apparatus according to the second embodiment of the present when the repetition period of an original adaptive excitation source is three times the pitch-period of an input speech.

FIGS. 7, 8, and 9 are diagrams for explaining the four other adaptive excitation sources generated by the adaptive excitation source generating unit 34 disposed within the speech coding apparatus and the speech decoding apparatus in accordance with the second embodiment of the present invention. FIG. 7 shows the case where the repetition period of the adaptive excitation source input to the repetition period pre-selecting unit is equal to the pitch-period of the input speech. FIG. 8 shows the case where the repetition period of the input adaptive excitation source is twice the pitch-period of the input speech. FIG. 9 shows the case where the repetition period of the input adaptive excitation source is three times the pitch-period of the input speech.

When the repetition period of the input adaptive excitation source is equal to the pitch-period of the input speech, the third and fourth other adaptive excitation sources generated with repetition periods obtained by multiplying the repetition period of the input adaptive excitation source by 1 and 2 can be selected because the distance between the first other adaptive excitation source and the third other adaptive excitation source, i.e., the original adaptive excitation source input to the repetition period pre-selecting unit (i.e., the uppermost signal of the figure) and the distance between the second other adaptive excitation source and the original adaptive excitation source are relatively long, as can be seen from FIG. 7.

When the repetition period of the input adaptive excitation source is twice the pitch-period of the input speech, the second and third other adaptive excitation sources generated with repetition periods obtained by multiplying the repetition period of the input adaptive excitation source by ½ and 1 can be selected because the distance between the second other adaptive excitation source and the original adaptive excitation source input to the repetition period pre-selecting unit (i.e., the uppermost signal of the figure) is relatively short, as can be seen from FIG. 8.

When the repetition period of the input adaptive excitation source is third times the pitch-period of the input speech, the first and third other adaptive excitation sources generated with repetition periods obtained by multiplying the repetition period of the input adaptive excitation source by ⅓ and 1 can be selected because the distance between the first other adaptive excitation source and the original adaptive excitation source input to the repetition period pre-selecting unit (i.e., the uppermost signal of the figure) is relatively short, as can be seen from FIG. 9.

Numerous variants may be made in the exemplary embodiment shown. As previously mentioned, the algebraic excitation source represented with the locations and polarities of a number of fixed waveforms or pulses can be used when coding and decoding the driving excitation source, and the present invention is, however, not limited to the structure in which the algebraic excitation source is used. The present invention can be applied to a CELP speech coding apparatus and CELP speech decoding apparatus using learning excitation source code book, a random excitation source code book, or the like.

Instead of the use of the pitch period of the input speech which was separately obtained in advance, the repetition period coder 28 can select one possible repetition period of the driving excitation source that minimizes the coding distortion, i.e., maximizes the evaluation value D. As an alternative, a value obtained by averaging the repetition periods of the adaptive excitation source obtained for a few previous frames can be used instead of the pitch-period of the input speech.

Instead of the linear prediction coefficient, another spectrum parameter, such as a line spectrum pair or LSP widely used, can be used.

In a variant, 1 can be eliminated from the constant number table 32, and the repetition period of the adaptive excitation source can be delivered directly to the pre-selecting unit 36. Even in this case, the pre-selecting unit 36 can work in the same way. Although the performance improvement is reduced, the constant number table 32 can include ½, 1, and 2 only.

As previously mentioned, in accordance with the second embodiment of the present invention, the speech coding apparatus generates a plurality of candidates for the repetition period of a driving excitation source by multiplying the repetition period of an adaptive excitation source by a plurality of constant numbers, generates a plurality of other adaptive excitation sources having repetition periods respectively equal to the plurality of possible repetition periods of the driving excitation source, and selects a predetermined number of candidates from all the candidates generated according to distances between any two of the plurality of other adaptive excitation sources. Accordingly, the speech coding apparatus can perform a pitch-filtering process of generating a pitch-filtered driving excitation source using the repetition period having a high probability of being the closest to the pitch-period of an input speech even when the pitch-period of the input speech is different from the repetition period of the original adaptive excitation source, thereby reducing the probability of occurrence of unstability in the synthesized speech. The speech coding apparatus of the present embodiment can generate high-quality speech code.

The repetition period pre-selecting unit pre-selects two candidates or possible repetition periods of the driving excitation source, and the repetition period coding unit encodes the selection information in one bit. Accordingly, the speech coding apparatus of the present embodiment can generate high-quality speech code only with a minimum additional amount of information.

In addition, the repetition period pre-selecting unit 31 generates a plurality of other adaptive excitation sources having repetition periods respectively equal to the plurality of possible repetition periods of the driving excitation source, and selects a predetermined number of candidates from all the candidates generated according to distances between any two of the plurality of other adaptive excitation sources. Accordingly, the repetition period pre-selecting unit can reject one or more candidates for the repetition period of the driving excitation source having a low probability of being the closest to the pitch-period of the input speech, thus eliminating driving excitation source coding processes for the rejected candidates that don't need evaluations and reducing the required amount of the selection information. Accordingly, the speech coding apparatus of the present embodiment can generate high-quality speech code only with a minimum additional amount of arithmetic operations and a minimum additional amount of information.

Furthermore, since the plurality of constant numbers by which the repetition period of the original adaptive excitation source is multiplied in the repetition period pre-selecting process includes ½ and 1, a number of candidates for the repetition period of the driving excitation source including the one that is the closest to the pitch-period of the input speech can be selected with a high probability while those choices are few. Accordingly, the speech coding apparatus of the present embodiment can generate high-quality speech code only with a minimum additional amount of arithmetic operations and a minimum additional amount of information.

As previously mentioned, in accordance with the second embodiment of the present invention, the speech decoding apparatus generates a plurality of candidates for the repetition period of a driving excitation source by multiplying the repetition period of an original adaptive excitation source by a plurality of constant numbers, pre-selects a predetermined number of candidates from all the candidates generated, further selects one candidate as the repetition period of the driving excitation source from the predetermined number of candidates pre-selected according to the selection information located within input speech code, the selection information indicating the selection of one possible repetition period of the driving excitation source made during coding, and decodes the driving excitation source code using the repetition period of the driving excitation source to reconstruct the driving excitation source. Accordingly, the speech decoding apparatus can perform a pitch-filtering process so as to generate a pitch-filtered driving excitation source using the repetition period having a high probability of being the closest to the pitch-period of the input speech even when the pitch-period of the input speech code is different from the repetition period of the original adaptive excitation source, thereby reducing the probability of occurrence of unstability in the synthesized speech. The speech decoding apparatus of the present embodiment can generate a high-quality speech.

The repetition period pre-selecting unit pre-selects two candidates or possible repetition periods of the driving excitation source, and the repetition period decoding unit decodes the selection information coded in one bit. Accordingly, the speech decoding apparatus of the present embodiment can reconstruct a high-quality speech only with a minimum additional amount of information.

In addition, the repetition period pre-selecting unit 31 generates a plurality of other adaptive excitation sources having repetition periods respectively equal to the plurality of possible repetition periods of the driving excitation source, and selects a predetermined number of candidates from all the candidates generated according to distances between any two of the plurality of other adaptive excitation sources. Accordingly, the repetition period pre-selecting unit can reject one or more candidates for the repetition period of the driving excitation source having a low probability of being the closest to the pitch-period of the input speech code, thus eliminating driving excitation source coding processes for the rejected candidates that don't need evaluations and reducing the required amount of the selection information. Accordingly, the speech decoding apparatus of the present embodiment can generate a high-quality speech only with a minimum additional amount of arithmetic operations and a minimum additional amount of information.

Furthermore, since the plurality of constant numbers by which the repetition period of the original adaptive excitation source is multiplied in the repetition period pre-selecting process includes ½ and 1, a number of candidates for the repetition period of the driving excitation source including the one that is the closest to the pitch-period of the input speech code can be selected with a high probability while those choices are few. Accordingly, the speech decoding apparatus of the present embodiment can reconstruct a high-quality speech only with a minimum additional amount of arithmetic operations and a minimum additional amount of information.

Embodiment 3

Figure 10:
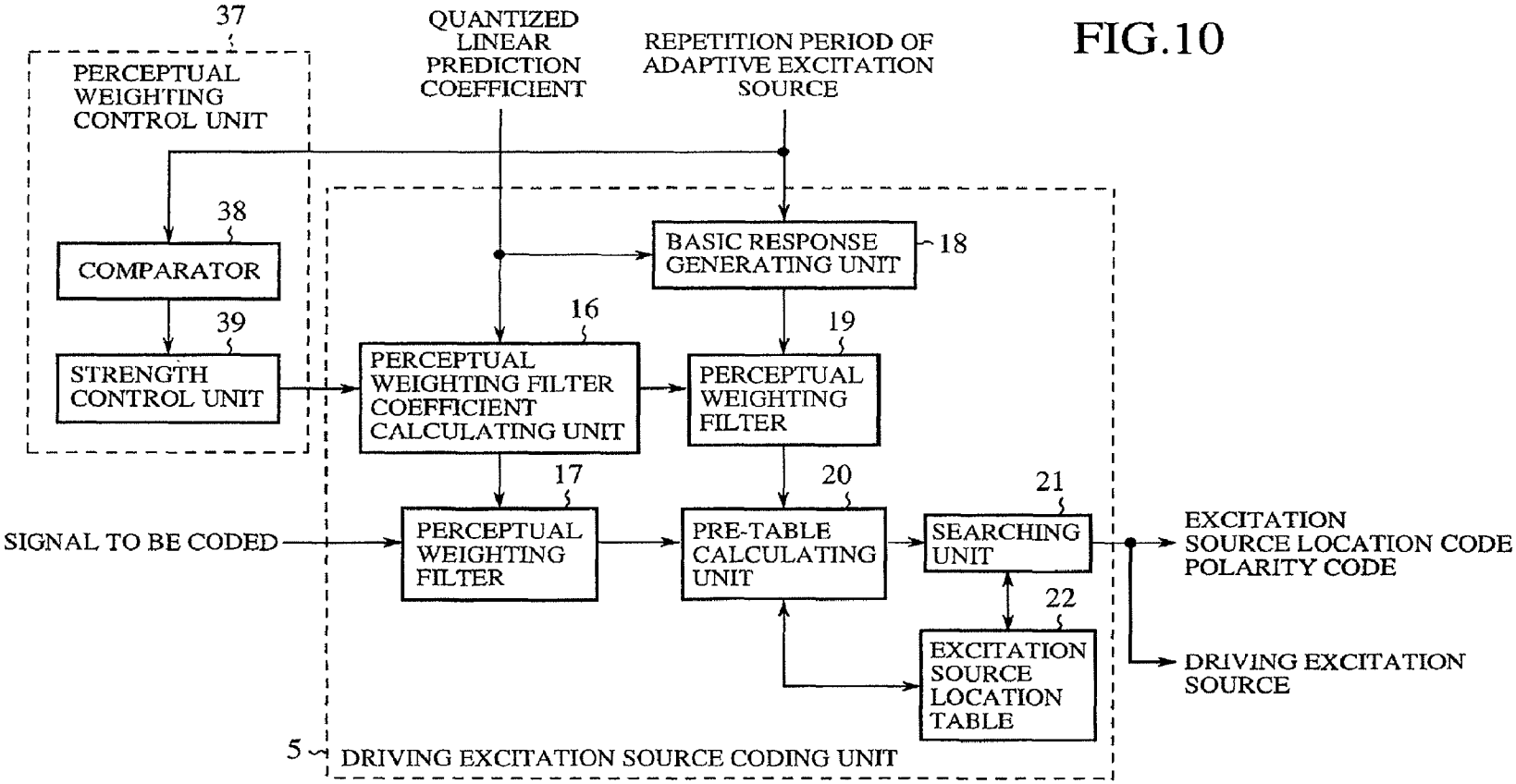
FIG. 10 is a block diagram showing the structure of a driving excitation source coding unit and a perceptual weighting control unit disposed within a speech coding apparatus according to a third embodiment of the present invention.

Referring next to FIG. 10, there is illustrated a block diagram showing the structure of a driving excitation source coding unit 5 and a perceptual weighting control unit 37 disposed within a speech coding apparatus in accordance with a third embodiment of the present invention. The overall structure of the speech coding apparatus of this embodiment thus involves the additional perceptual weighting control unit 37 connected to the driving excitation source coding unit 5 in addition to the structure as shown in FIG. 14. The perceptual weighting control unit 37 includes a comparator 38 and a strength control unit 39. The driving excitation source coding unit 5 has the same structure as the conventional driving excitation source coding unit as shown in FIG. 17, with the exception that a perceptual weighting filter coefficient calculating unit 16 is controlled by the perceptual weighting control unit 37.

In operation, a linear prediction coefficient coding unit 3, as shown in FIG. 14, of the speech coding apparatus delivers a quantized linear prediction coefficient to the perceptual weighting filter coefficient calculating unit 16 and a basic response generating unit 18 disposed within the driving excitation source coding unit 5. An adaptive excitation source coding unit 4 converts adaptive excitation source code into a repetition period of an adaptive excitation source and then furnishes the repetition period of the adaptive excitation source to the basic response generating unit 18 of the driving excitation source coding unit 5 and the comparator 38 of the perceptual weighting control unit 37. The adaptive excitation source coding unit 4 also delivers either an input speech 1 or a signal obtained by subtracting a synthesized speech generated based on the adaptive excitation source from the input speech 1, as a signal to be coded, to a perceptual weighting filter 17.

The comparator 38 of the perceptual weighting control unit 37 compares the input repetition period of the adaptive excitation source with a predetermined threshold value and furnishes the comparison result to the strength control unit 39. The predetermined threshold value can be about 40 which can substantially separate the distribution of pitch-periods into a male-speech region and a female-speech region.

The strength control unit 39 determines the strength coefficient to control an enhanced strength for the perceptual weighting filter 17 and another perceptual weighting filter 19 according to the comparison result from the comparator 38, and furnishes the determined strength coefficient to the perceptual weighting filter coefficient calculating unit 16 of the driving excitation source coding unit 5. When the comparison result from the comparator 38 indicates that the repetition period of the adaptive excitation source is equal to or greater than the predetermined threshold value, the strength control unit 39 determines the strength coefficient so that the perceptual weighting strength becomes lower because there is a high possibility that the speech to be coded is a male speech. In contrast, when the comparison result from the comparator 38 indicates that the repetition period of the adaptive excitation source is less than the predetermined threshold value, the strength control unit 39 determines the strength coefficient so that the perceptual weighting strength becomes higher because there is a high possibility that the speech to be coded is a female speech. A multiplier by which the linear prediction coefficient is multiplied, the linear prediction coefficient being used for calculating the perceptual weighting filter coefficient, can be used as the strength coefficient, for example.

The perceptual weighting filter coefficient calculating unit 16 calculates the perceptual weighting filter coefficient using the quantized linear prediction coefficient and the strength coefficient, and defines the calculated perceptual weighting filter coefficient as a filter coefficient for the two perceptual weighting filters 17 and 19.

After that, the first perceptual weighting filter 17, the basis response generating unit 18, the second perceptual weighting filter 19, a pre-table calculating unit 20, a searching unit 21, and an excitation source location table 22 operate in the same way that the same components of conventional speech coding apparatuses mentioned above do, and therefore the description of the operations of those components will be omitted hereinafter.

Numerous variants may be made in the exemplary embodiment shown. It is clear that instead of determining the strength coefficient according to whether or not the repetition period of the adaptive excitation source is equal to or greater than a predetermined threshold value, the perceptual weighting control unit 37 can control the strength coefficient more finely using two or more predetermined threshold values or continuously control the strength coefficient according to the difference between the repetition period of the adaptive excitation source and a predetermined threshold value.

The present embodiment is not limited to the above-mentioned algebraic excitation source arrangement using algebraic excitation sources when coding the driving excitation source, and can be applied to a CELP speech coding apparatus using a learning excitation source code book, a random excitation source code book, or the like.

Instead of the linear prediction coefficient, another spectrum parameter, such as a line spectrum pair or LSP widely used, can be used.

As previously mentioned, in accordance with the third embodiment of the present invention, the speech coding apparatus controls the perceptual weighting strength coefficient based on the repetition period of the adaptive excitation source, calculates the filter coefficient for the two perceptual weighting filters using the perceptual weighting strength coefficient, and performs a perceptual weighting process on the signal to be coded, which is used for coding the driving excitation source. Accordingly, the perceptual weighting process can be optimized for male and female speeches, and the speech coding apparatus of the third embodiment can provide high-quality speech code.

Embodiment 4

Figure 11:
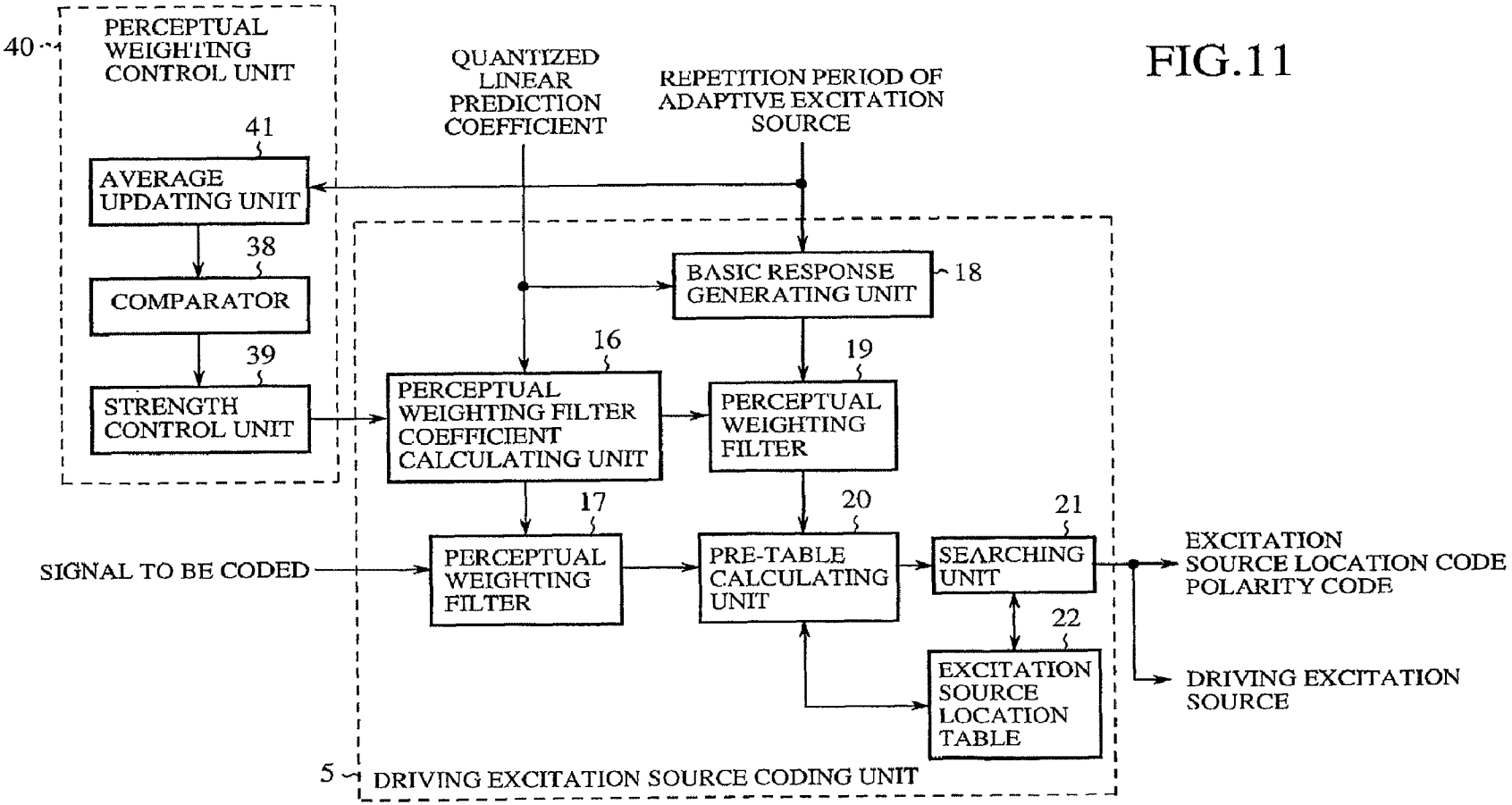
FIG. 11 is a block diagram showing the structure of a driving excitation source coding unit and a perceptual weighting control unit disposed within a speech coding apparatus according to a fourth embodiment of the present invention.

Referring next to FIG. 11, there is illustrated a block diagram showing the structure of a driving excitation source coding unit 5 and an additional perceptual weighting control unit 40 disposed within a speech coding apparatus in accordance with a fourth embodiment of the present invention. The overall structure of the speech coding apparatus of this embodiment thus involves the additional perceptual weighting control unit 40 connected to the driving excitation source coding unit 5 in addition to the structure as shown in FIG. 14. The perceptual weighting control unit 40 includes a comparator 38, a strength control unit 39, and an average updating unit 41. The driving excitation source coding unit 5 has the same structure as the conventional driving excitation source coding unit as shown in FIG. 17, with the exception that a perceptual weighting filter coefficient calculating unit 16 is controlled by the perceptual weighting control unit 40.

Since the present embodiment differs from the above-mentioned third embodiment in that the perceptual weighting control unit 40 includes the average updating unit 41 in addition to the structure of the perceptual weighting control unit 37 of the third embodiment, the description will be mainly directed to the operation of the additional component. An adaptive excitation source coding unit 4 converts an adaptive excitation source code into a repetition period of an adaptive excitation source and then furnishes the repetition period of the adaptive excitation source to a basic response generating unit 18 of the driving excitation source coding unit 5 and the average updating unit 41 of the perceptual weighting control unit 40.

The average updating unit 41 of the perceptual weighting control unit 40 updates an average of previously stored repetition periods of the adaptive excitation source using the input repetition period of the adaptive excitation source, and delivers the averaged repetition period to the comparator 38. There can be provided some methods of easily updating the average including an averaging method of calculating the sum of the product of the repetition period of the adaptive excitation source associated with the current frame and a constant number $\alpha$ less than 1 and the product of the previous average and $(1-\alpha)$. Since the aim of obtaining the average is to precisely determine whether the input speech is a male speech or a female speech, it is preferable to limit the updating to frames with a large adaptive excitation source gain.

The comparator 38 compares the updated average with a predetermined threshold value and furnishes the comparison result to the strength control unit 39. The strength control unit 39 determines a strength coefficient to control an enhanced strength for perceptual weighting filters 17 and 19 based on the comparison result from the comparator 38, and furnishes the determined strength coefficient to the perceptual weighting filter coefficient calculating unit 16 of the driving excitation source coding unit 5. When the comparison result from the comparator 38 indicates that the average is equal to or greater than the predetermined threshold value, the strength control unit 39 determines the strength coefficient so that the perceptual weighting strength becomes lower because there is a high possibility that the speech to be coded is a male speech. In contrast, when the comparison result from the comparator 38 indicates that the average is less than the predetermined threshold value, the strength control unit 39 determines the strength coefficient so that the perceptual weighting strength becomes higher because there is a high possibility that the speech to be coded is a female speech.

After that, the perceptual weighting filter coefficient calculating unit 16, the first perceptual weighting filter 17, the basis response generating unit 18, the second perceptual weighting filter 19, a pre-table calculating unit 20, a searching unit 21, and an excitation source location table 22 operate in the same way that the same components of conventional speech coding apparatuses as shown in FIG. 17 do, and therefore the description of the operations of those components will be omitted hereinafter.

Numerous variants may be made in the exemplary embodiment shown. It is clear that instead of determining the strength coefficient according to whether or not the averaged repetition period of the adaptive excitation source is equal to or greater than a predetermined threshold value, the perceptual weighting control unit 40 can control the strength coefficient more finely using two or more predetermined threshold values or continuously control the strength coefficient according to the difference between the averaged repetition period of the adaptive excitation source and a predetermined threshold value.

The present embodiment is not limited to the above-mentioned algebraic excitation source arrangement using algebraic excitation sources when coding the driving excitation source, and can be applied to a CELP speech coding apparatus using a learning excitation source code book, a random excitation source code book, or the like.

Instead of the linear prediction coefficient, another spectrum parameter, such as a line spectrum pair or LSP widely used, can be used.

As previously mentioned, in accordance with the fourth embodiment of the present invention, the speech coding apparatus controls the perceptual weighting strength coefficient based on the averaged repetition period of the adaptive excitation source, calculates the filter coefficient for the two perceptual weighting filters using the perceptual weighting strength coefficient, and performs a perceptual weighting process on the signal to be coded, which is used for coding the driving excitation source. Accordingly, the perceptual weighting process can be optimized for male and female speeches, and the speech coding apparatus of the fourth embodiment can provide high-quality speech code.

Because of the use of the averaged repetition period of the adaptive excitation source, the present embodiment can prevent the perceptual weighting strength from frequently varying and hence reduce the occurrence of unstability in the speech code.

Embodiment 5

Referring next to FIG. 12, there is illustrated an excitation source location table 22 which is used by a driving excitation source coding unit 5 of a speech coding apparatus according to a fifth embodiment of the present invention and a driving excitation source decoding unit 12 of a speech decoding apparatus according to the fifth embodiment. The excitation source location table 22 of this embodiment further includes a certain magnitude for each of a plurality of excitation source numbers in addition to the same elements as the prior art excitation source location table as shown in FIG. 16.

In the same excitation source location table, the fixed magnitude provided for each of the plurality of excitation source numbers depends on the number of candidates for the excitation source location provided for a corresponding excitation source number. In the example as shown in FIG. 12, each of the excitation source numbers starting from No. 1 to 3 includes 8 candidates for the excitation source location and the same fixed magnitude of 1.0. Since the number of candidates included in the last excitation source number, i.e., No. 4 is 16, which is greater than the number of candidates included in any other excitation source number, a fixed magnitude of 1.2 larger than any other fixed magnitude in the same location table is provided for the excitation source number 4. In this manner, the larger the number of candidates for the excitation source location, the larger a fixed magnitude is provided.

Searching for an optimum combination of excitation source locations using the excitation source location table having the additional fixed magnitudes can be performed based on the above-mentioned equation (1). In this embodiment, C and E of the equation (1) are given by:

$$C = \sum_k d''(m_k) \tag{8}$$

$$E = \sum_k \sum_i \phi''(m_k, m_i) \tag{9}$$

$d''(m_k)$ and $\phi''(m_k, m_i)$ are given by:

$$d''(m_k)=a_k d'(m_k) \tag{10}$$

$$\phi''(m_k, m_i)=a_k a_i \phi'(m_k, m_i) \tag{11}$$

where $a_k$ is the magnitude of the kth pulse, which is equal to one magnitude listed in the excitation source location table of FIG. 12. Only calculating and storing $d''(m_k)$ and $\phi''(m_k, m_i)$ as a pre-table in advance of the calculation of the evaluation value D for all combinations of all pulse locations is thus needed before the simple summations according to the equations (8) and (9), thereby reducing the amount of arithmetic operations.

The decoding of the driving excitation source can be performed by selecting one excitation source location for each of the plurality of excitation source numbers stored in the excitation source location table of FIG. 12 based on the excitation source location code, and for placing an excitation source, which is then multiplied by the fixed magnitude provided for each of the plurality of excitation source numbers, at a corresponding excitation source location selected for each of the plurality of excitation source numbers. When each of the plurality of excitation sources placed is not a pulse or when generating a series of pitch-cycles each includes the plurality of excitation sources, elements of the plurality of excitation sources placed overlap and all that is needed is to calculate the sum of all overlapped portions. In other words, the driving excitation source decoding process of the present embodiment includes the process of multiplying a plurality of excitation sources to be placed by respective fixed magnitudes provided for the plurality of excitation source numbers in addition to the conventional algebraic excitation source decoding process.

In a prior art decoding process in which a fixed waveform is prepared for each of the plurality of excitation source numbers, a basic response has to be calculated for each of the plurality of excitation source numbers. In contrast, in accordance with the present embodiment, only a modification of the pre-table is added as previously mentioned. In any prior art decoding process, the magnitude of each of the plurality of excitation sources is maintained constant even though the amount of location information (i.e., the number of candidates for the excitation source location) varies from excitation source number to excitation source number.

As previously mentioned, in accordance with the fifth embodiment of the present invention, the speech coding apparatus provides a certain magnitude depending on the number of candidates for the location of each of a plurality of excitation sources for each of the plurality of excitation sources and multiplies the plurality of excitation sources placed at respective possible locations by the plurality of fixed magnitudes, respectively, by means of the driving excitation source coding unit 5. The driving excitation source coding unit 5 then generates a driving excitation source by calculating the sum of all the excitation sources placed at the respective possible locations for each of all combinations of possible locations of the plurality of excitation sources, and searches for excitation source code and polarity code associated with one driving excitation source exhibiting the smallest coding distortion between itself and the input speech, the excitation source code indicating the locations of the plurality of excitation sources placed and the polarity code indicating the polarities of the plurality of excitation sources placed. The speech coding apparatus can avoid waste concerned with the setting of the magnitudes of the plurality of excitation sources to a fixed value, and generate high-quality speech code.

Similarly, in accordance with the fifth embodiment of the present invention, the speech decoding apparatus provides a certain magnitude depending on the number of candidates for the location of each of a plurality of excitation sources for each of the plurality of excitation sources. The driving excitation source decoding unit 12 then generates a driving excitation source by calculating the sum of all the excitation sources placed at respective possible locations defined by the excitation source location coded included in the input speech code while multiplying the plurality of excitation sources placed at the respective possible locations by the plurality of fixed magnitudes, respectively. The speech decoding apparatus can avoid waste concerned with the setting of the magnitudes of the plurality of excitation sources to a fixed value, and reconstruct a high-quality speech.

Embodiment 6

Figure 13:
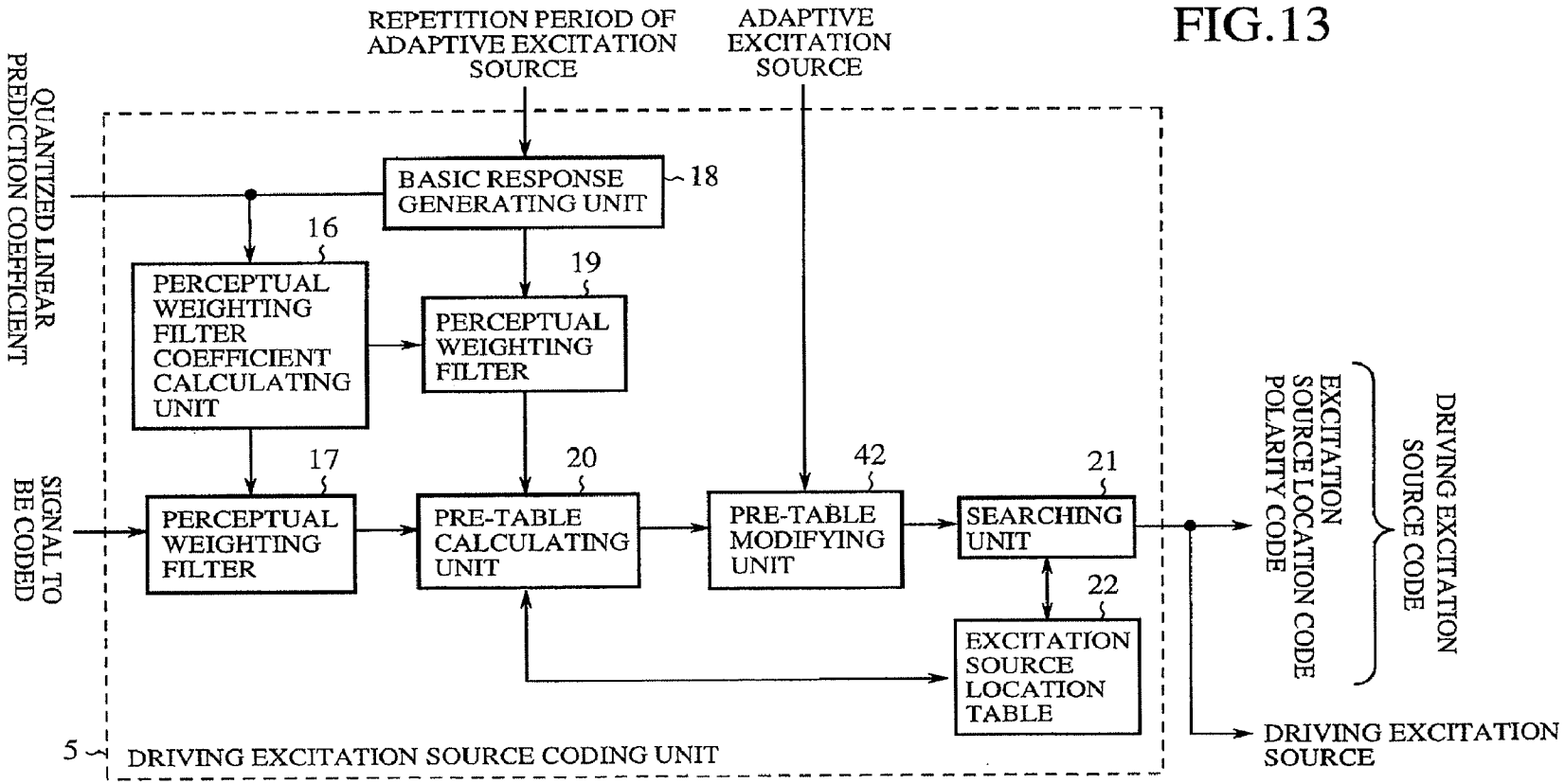
FIG. 13 is a block diagram showing the structure of a driving excitation source coding unit of a speech coding apparatus in accordance with a sixth embodiment of the present invention.

Referring next to FIG. 13, there is illustrated a block diagram showing the structure of a driving excitation source coding unit 5 of a speech coding apparatus in accordance with a sixth embodiment of the present invention. The overall structure of the speech coding apparatus of this embodiment is the same as that of prior art speech coding apparatuses as shown in FIG. 14. In FIG. 13, reference numeral 42 denotes a pre-table modifying unit. The speech coding apparatus of the sixth embodiment can make a perceptual weighted signal to be coded orthogonal to an adaptive excitation source using only the additional pre-table modifying unit 42.

In operation, a linear prediction coefficient coding unit 3 delivers a quantized linear prediction coefficient to both a perceptual weighting filter coefficient calculating unit 16 disposed within the driving excitation source coding unit 5 and a basic response generating unit 18. An adaptive excitation source coding unit 4 converts an adaptive excitation source code into a repetition period of an adaptive excitation source and then furnishes the repetition period of the adaptive excitation source to the basic response generating unit 18 located within the driving excitation source coding unit 5. The adaptive excitation source coding unit 4 also delivers either an input speech 1 or a signal obtained by subtracting a synthesized speech generated based on the adaptive excitation source from the input speech 1, as a signal to be coded, to a perceptual weighting filter 17. The adaptive excitation source coding unit 4 further furnishes the adaptive excitation source to the pre-table modifying unit 42 located within the driving excitation source coding unit 5.

The perceptual weighting filter coefficient calculating unit 16 calculates a perceptual weighting filter coefficient using the quantized linear prediction coefficient and defines the calculated perceptual weighting filter coefficient as a filter coefficient for the perceptual weighting filter 17 and another perceptual weighting filter 19. The perceptual weighting filter 17 performs a filtering process on the input signal to be coded using the filter coefficient set by the perceptual weighting filter coefficient calculating unit 16.

The basic response generating unit 18 performs a pitch-filtering process on either a unit pulse or a fixed waveform using the input repetition period of the adaptive excitation source so as to generate a series of pitch-cycles each of which includes either the unit pulse or the fixed waveform. The basic response generating unit 18 then generates a synthesized speech by allowing the generated signal as an excitation source to pass through a synthesis filter constructed using the quantized linear prediction coefficient, and furnishes the synthesized speech as a basic response to the perceptual weighting filter 19. The perceptual weighting filter 19 performs a filtering process on the input basic response using the filter coefficient set by the perceptual weighting filter coefficient calculating unit 16.

The pre-table calculating unit 20 calculates a correlation d(x) between the perceptual weighed signal to be coded from the perceptual weighting filter 17 and each of the plurality of perceptual weighed basic responses from the perceptual weighting filter 19, i.e., each of a plurality of perceptual weighed synthesized speeches respectively generated based on a plurality of temporary driving excitation sources, which are signals obtained by placing a predetermined excitation source at all possible excitation source locations, respectively. The pre-table calculating unit 20 also calculates a cross-correlation $\phi(x,y)$ between any two of the plurality of perceptual weighted basic responses, i.e., any two of the plurality of synthesized speeches respectively generated based on the plurality of temporary driving excitation sources. d(x) and $\phi(x,y)$ are stored as a pre-table.

The pre-table modifying unit 42 accepts the adaptive excitation source and the pre-table stored in the pre-table calculating unit 20 and modifies the pre-table according to the following [equations] *equation* (12) and *either the following equation* (13) *or equivalent* (*13'*). The pre-table modifying unit 42 then calculates d'(x) and $\phi'(x,y)$ according to the following equations (14) and (15) and stores these parameters as a new pre-table.

$$\hat{d}(x) = d(x) - \frac{c_x c_{tgt}}{p_{acb}} \tag{12}$$

$$\hat{\phi}(x, y) = \phi(x, y) - \frac{c_x c_y}{p_{acb}} \tag{13}$$

*equation* (*13*) *being equivalent to the following equation:*

$$\hat{\phi}(x, y) = \frac{1}{p_{acb}}(p_{pacb}\phi(x, y) - c_x c_y) \tag{13'}$$

$$d'(m_k)=|\hat{d}(m_k)| \tag{14}$$

$$[\phi(m_k, m_i)\ \mathrm{sign}[\hat{d}(m_k)]\mathrm{sign}[\hat{d}(m_i)](m_k, m_i) \tag{15}]$$

$$\phi'(m_k, m_i)=sign[\hat{d}(m_k)]sign[\hat{d}(m_i)]\hat{\phi}(m_k, m_i) \tag{15}$$

where $c_{tgt}$ is a correlation between the perceptual weighted signal to be coded and a perceptual weighted adaptive excitation source response (i.e., synthesized speech), i.e., a correlation between the perceptual weighted signal to be coded and a synthesized speech generated based on the perceptual weighted adaptive excitation source, $c_x$ is a correlation between a signal created by placing the perceptual weighted basic response at the excitation source location x and the perceptual weighted adaptive excitation source response (i.e., synthesized speech), i.e., a correlation between each of the plurality of perceptual weighed synthesized speeches respectively generated based on the plurality of temporary driving excitation sources and the synthesized speech generated based on the adaptive excitation source, and $p_{acb}$ is the power of the perceptual weighted adaptive excitation source response (i.e., synthesized speech).

The searching unit 21 sequentially reads the plurality of candidates for the excitation source location from the excitation source location table 22, and calculates the evaluation value D for each of all combinations of possible excitation source locations using the pre-table stored in the pre-table modifying unit 42, i.e., d'(x) and $\phi'(x,y)$ calculated for each of all combinations of possible excitation source locations according to the equations (1), (4) and (5). The searching unit 21 then searches for one combination of excitation source locations that maximizes the evaluation value D and furnishes excitation source location code (i.e., indexes of the excitation source location table) indicating the plurality of possible excitation source locations searched for and polarity code indicating the polarities of the plurality of excitation sources, as driving excitation source code. The searching unit 21 generates a time-series vector associated with the driving excitation source code as a driving excitation source.

As previously mentioned, in accordance with the sixth embodiment of the present invention, the speech coding apparatus calculates a correlation $c_{tgt}$ between the perceptual weighted signal to be coded and a synthesized speech generated based on the perceptual weighted adaptive excitation source, and a correlation $c_x$ between each of a plurality of perceptual weighed synthesized speeches respectively generated based on a plurality of temporary driving excitation sources, which are associated with all possible excitation source locations, respectively, and the synthesized speech generated based on the adaptive excitation source, and then modifies the pre-table using these correlations. Accordingly, the speech coding apparatus can make the perceptual weighted signal to be coded orthogonal to the adaptive excitation source without increase in the amount of arithmetic operations in the searching unit 21, thereby improving the coding performance and providing high-quality speech code.

Many widely different embodiments of the present invention may be constructed without departing from the spirit and scope of the present invention. It should be understood that the present invention is not limited to the specific embodiments described in the specification, except as defined in the appended claims.

The invention claimed is:

[1. A speech coding apparatus for coding an input speech on a frame-by-frame basis using an adaptive excitation source, which is generated from a past excitation source, and a driving excitation source, which is generated from the input speech and the adaptive excitation source, so as to generate speech code, said speech coding apparatus comprising:

a repetition period pre-selecting means for generating a plurality of candidates for a repetition period of the driving excitation source by multiplying a repetition period of the adaptive excitation source by a plurality of constant numbers, respectively, and for pre-selecting a predetermined number of candidates from all the candidates generated and furnishing the predetermined number of pre-selected candidates;

a driving excitation source coding means for providing both excitation source location information and excitation source polarity information that minimize a coding distortion, for each of the predetermined number of candidates for the repetition period of the driving excitation source, and for providing an evaluation value associated with the minimum coding distortion for each of the predetermined number of candidates; and a repetition period coding means for comparing the evaluation values provided for the predetermined number of candidates for the repetition period of the driving excitation source from said driving excitation source coding means with one another, for selecting one candidate from the predetermined number of candidates according to a comparison result, and for furnishing selection information indicating a selection result, excitation source location code indicating excitation source location information associated with the selected candidate for the repetition period of the driving excitation source, and polarity code indicating excitation source polarity information associated with the selected candidate.]

[2. The speech coding apparatus according to claim 1, wherein said repetition period pre-selecting means pre-selects two candidates from all the candidates generated, and said repetition period coding means encodes the selection result in one bit so as to generate 1-bit selection information.]

[3. The speech coding apparatus according to claim 1, wherein said repetition period pre-selecting means includes a means for comparing the repetition period of the adaptive excitation source with a predetermined threshold value, and for pre-selecting the predetermined number of candidates from all the candidates generated according to a comparison result.]

[4. The speech coding apparatus according to claim 1, wherein said repetition period pre-selecting means includes a means for generating a plurality of other adaptive excitation sources whose respective repetition periods equal to the plurality of candidates for the repetition period of the driving excitation source, respectively, and for pre-selecting the predetermined number of candidates from all the candidates generated according to a comparison between distances among the plurality of other adaptive excitation sources generated.]

[5. The speech coding apparatus according to claim 1, wherein said plurality of constant numbers, by which the repetition period of the adaptive excitation source is multiplied, includes ½ and 1.]

[6. A speech decoding apparatus for decoding input speech code on a frame-by-frame basis using an adaptive excitation source, which is generated from a past excitation source, and a driving excitation source, which is generated from the input speech code and the adaptive excitation source, so as to reconstruct original speech, said speech decoding apparatus comprising:

a repetition period pre-selecting means for providing a plurality of candidates for a repetition period of the driving excitation source by multiplying a repetition period of the adaptive excitation source by a plurality of constant numbers respectively, and for pre-selecting a predetermined number of candidates from all the candidates generated and furnishing the predetermined number of pre-selected candidates;

a repetition period decoding means for selecting one candidate from the predetermined number of pre-selected candidates for the repetition period of the driving excitation source from said repetition period pre-selecting means according to selection information included in said input coded speech and indicating the selection, and for furnishing the selected candidate as the repetition period of the driving excitation source; and a driving excitation source decoding means for generating a time-series signal according to excitation source location code and excitation source polarity code included in the input speech code, and for generating a time-series vector that is a series of pitch-cycles, each of which includes the time-series signal, using the repetition period of the driving excitation source from said repetition period decoding means.]

[7. The speech decoding apparatus according to claim 6, wherein said repetition period pre-selecting means pre-selects two candidates from all the candidates generated, and said repetition period decoding means decodes selection information coded in one bit, which is included in the input speech code and indicates a selection of a candidate for the repetition period of the adaptive excitation source made during coding.]

[8. The speech decoding apparatus according to claim 6, wherein said repetition period pre-selecting means includes a means for comparing the repetition period of the adaptive excitation source with a predetermined threshold value, and for pre-selecting the predetermined number of candidates from all the candidates generated according to a comparison result.]

[9. The speech decoding apparatus according to claim 6, wherein said repetition period pre-selecting means includes a means for generating a plurality of other adaptive excitation sources whose respective repetition periods equal to the plurality of candidates for the repetition period of the driving excitation source, respectively, and for pre-selecting the predetermined number of candidates from all the candidates generated according to a comparison between distances among the plurality of other adaptive excitation sources generated.]

[10. The speech decoding apparatus according to claim 6, wherein the plurality of constant numbers, by which the repetition period of the adaptive excitation source is multiplied, includes ½ and 1.]

[11. A speech coding apparatus for coding an input speech on a frame-by-frame basis using an adaptive excitation source, which is generated from a past excitation source, and a driving excitation source generated from the input speech and the adaptive excitation source, said driving excitation source being represented by locations and polarities of a plurality of excitation sources, so as to generate speech code, said speech coding apparatus comprising:

an excitation source location table including a plurality of selectable possible locations and a fixed magnitude determined based on the number of the plurality of possible locations for each of the plurality of excitation sources;

a driving excitation source coding means for placing the plurality of excitation sources at respective possible locations while multiplying each of the plurality of excitation sources by a corresponding fixed magnitude, with reference to said excitation source location table, for generating a driving excitation source by calculating a sum of the plurality of excitation sources each of which has been multiplied by the corresponding fixed magnitude and is thus placed at one corresponding possible location, for each of all combinations of possible locations of the plurality of excitation sources, and for selecting possible locations and polarities of the plurality of excitation sources which provide a driving excitation source having a smallest coding distortion between itself and the input speech so as to generate excitation source location code and polarity code.]

[12. A speech decoding apparatus for decoding input speech code on a frame-by-frame basis using an adaptive excitation source, which is generated from a past excitation source, and a driving excitation source generated from the input speech code and the adaptive excitation source, said driving excitation source being represented by locations and polarities of a plurality of excitation sources, so as to reconstruct original speech, said speech decoding apparatus comprising:

an excitation source location table including a plurality of selectable possible locations and a fixed magnitude determined based on the number of the plurality of possible locations for each of the plurality of excitation sources;

a driving excitation source decoding means for selecting respective possible locations for the plurality of excitation sources with reference to said excitation source location table based on excitation source location code included in the input speech code, for placing the plurality of excitation sources at the respective selected possible locations while multiplying each of the plurality of excitation sources by a corresponding fixed magnitude, and for generating a driving excitation source by calculating a sum of the plurality of excitation sources each of which has been multiplied by the corresponding fixed magnitude and is thus placed at the corresponding possible location.]

[13. A speech coding apparatus for coding an input speech on a frame-by-frame basis using an adaptive excitation source, which is generated from a past excitation source, and a driving excitation source generated from the input speech and the adaptive excitation source, said driving excitation source being represented by locations and polarities of a plurality of excitation sources, so as to generate speech code, said speech coding apparatus comprising:

a pre-table calculating means for calculating a correlation between a signal to be coded and each of a plurality of synthesized speeches each of which is generated based on a corresponding temporary driving excitation source that is a signal obtained by placing a predetermined excitation source at a corresponding one of all possible locations, and a cross-correlation between any two of the plurality of synthesized speeches, and for storing these calculated correlations and cross-correlations as a pre-table therein;

a pre-table modifying means for calculating a correlation between the signal to be coded and a synthesized speech generated based on the adaptive excitation source, and a correlation between each of the plurality of synthesized speeches generated based on the corresponding temporary driving excitation source and the synthesized speech generated based on the adaptive excitation source, and for modifying said pre-table using these calculated correlations; and a searching means for determining the locations and polarities of the plurality of excitation sources using the pre-table corrected by said pre-table modifying means so as to generate excitation source location code indicating the locations of the plurality of excitation sources and excitation source polarity code indicating the polarities of the plurality of excitation sources.]

[14. The speech coding apparatus of claim 13, wherein the signal to be coded is at least one of: the input speech, and a synthesized signal generated from the input speech.]

*15. A speech coding apparatus for coding an input speech on a frame-by-frame basis using an adaptive excitation source, which is generated from a past excitation source, and a driving excitation source, which includes a predetermined number of pulse locations and polarities being associated with the pulse locations, so as to generate speech code, said speech coding apparatus comprising:*

*a cross-correlation calculating unit for calculating a cross-correlation between a first impulse response generated when an impulse is placed at a first pulse location among a plurality of pulse locations and a second impulse response generated when an impulse is placed at a second pulse location among the plurality of pulse locations, for all combinations of the first and second pulse locations;*

*a cross-correlation modifying unit for calculating a correlation between an impulse response generated when an impulse is placed at a pulse location among the plurality of pulse locations and a synthesized speech generated based on the adaptive excitation source, and for modifying the cross-correlation calculated by said cross-correlation calculating unit, using the correlation; and*

*a searching unit for searching for each location of the predetermined number of the pulse locations of the driv-*

*ing excitation source, using the cross-correlation modified by said cross-correlation modifying unit,*

*wherein said cross-correlation modifying unit modifies the cross-correlation by subtracting a value based on a product of the correlations from a value based on the cross-correlation.*

*16. A speech coding method for coding an input speech on a frame-by-frame basis using an adaptive excitation source, which is generated from a past excitation source, and a driving excitation source, which includes a predetermined number of pulse locations and polarities being associated with the pulse locations, so as to generate speech code, said speech coding method comprising the steps of:*

*calculating by a cross-correlation calculating unit, a cross-correlation between a first impulse response generated when an impulse is placed at a first pulse location among a plurality of pulse locations and a second impulse response generated when an impulse is placed at a second pulse location among the plurality of pulse locations, for all combinations of the first and second pulse locations;*

*calculating a correlation between an impulse response generated when an impulse is placed at a pulse location among the plurality of pulse locations and a synthesized speech generated based on the adaptive excitation source, and modifying the cross-correlation calculated by said cross-correlation calculating step, using the correlation; and*

*searching for each location of the predetermined number of the pulse locations of the driving excitation source, using the cross-correlation modified by said cross-correlation modifying step,*

*wherein said cross-correlation modifying step modifies the cross-correlation by subtracting a value based on a product of the correlations from a value based on the cross-correlation.*

*17. The speech coding method of claim 16, wherein said cross-correlation modifying step is performed by a cross-correlation modifying unit.*

*18. The speech coding method of claim 17, wherein said searching step is performed by a searching unit.*

* * * * *